United States Patent
Dabbiru et al.

(10) Patent No.: US 10,204,239 B2
(45) Date of Patent: Feb. 12, 2019

(54) METHODS AND SYSTEMS FOR DETECTING DEVICE OR CARRIER CHANGE CONVERSIONS

(71) Applicant: Google Inc., Mountain View, CA (US)

(72) Inventors: Lakshmi Kumar Dabbiru, Sunnyvale, CA (US); Senthil Hariramasamy, Los Altos, CA (US); Gaurav Garg, Palo Alto, CA (US)

(73) Assignee: Google LLC, Mountain View, CA (US)

(*) Notice: Subject to any disclaimer, the term of this patent is extended or adjusted under 35 U.S.C. 154(b) by 783 days.

(21) Appl. No.: 14/594,955

(22) Filed: Jan. 12, 2015

(65) Prior Publication Data

US 2016/0203338 A1    Jul. 14, 2016

(51) Int. Cl.
G06F 17/30 (2006.01)
G06F 7/00 (2006.01)
G06F 21/64 (2013.01)

(52) U.S. Cl.
CPC ...... G06F 21/645 (2013.01); G06F 17/30371 (2013.01)

(58) Field of Classification Search
CPC ............................ G06F 21/64; G06F 17/30371
USPC ........................................................ 707/687
See application file for complete search history.

(56) References Cited

U.S. PATENT DOCUMENTS

| 2013/0225282 A1* | 8/2013 | Williams | A63F 13/216 463/29 |
| 2015/0222704 A1* | 8/2015 | Kipp | H04L 67/1097 709/213 |
| 2015/0262226 A1* | 9/2015 | Howe | G06Q 30/0248 705/14.47 |

OTHER PUBLICATIONS

Advanced Mobile and Tablet Options in Display Network only Campaigns, searched via internet at https://support.google.com/adwords/answer/1722028?hl=en , on Dec. 10, 2014 (2 pgs).
How Knowing the device, carrier and connection helps marketers: Q&A with Digital Element and dotMobi, posted by Mobithinking—Sep. 13, 2013, searched via internet at http://mobiforge.com/news-comment/how-knowing-device-carrier-and-connection-helps-marketers-q-a-with-digital-element-and-dotmobi , on Dec. 10, 2014 (3 pgs.).

* cited by examiner

*Primary Examiner* — Kuen S Lu
(74) *Attorney, Agent, or Firm* — Foley and Lardner LLP

(57) ABSTRACT

Systems and methods for detecting device or carrier change conversions based on device information and carrier information that is received with requests to provide content to communication devices is provided. A system can receive requests to provide content including a device identifier, an account identifier identifying an account agnostic to the device, and a carrier identifier. The system can serve content items in response to the requests to provide content that are related to communication devices different from the device associated with the device identifier or carriers different from the carrier associated with the carrier identifier. The system can detect, from the contents of a subset of the requests to provide content, that the account identifier is associated with a different device identifier or carrier identifier and identify one or more content items corresponding to the different device identifier or carrier identifier. The system can then attribute credit for the change in device identifier or carrier identifier to the identified content items.

18 Claims, 6 Drawing Sheets

| Time stamp | Content ID | Device ID | Carrier ID | Account ID | Query/Keyword | Device Type | Action Type |
|---|---|---|---|---|---|---|---|
| 12:01 1-2-14 | 1234att | 1S2Q | TMO | 1234 | Best carrier | DEVICE 1 | Click |
| 02:54 1-3-14 | 1235att | 1S4Q | internet | 1234 | DEVICE 3 | DEVICE 2 | No Action |
| 09:43 1-3-14 | 1236sprint | 1S2Q | TMO | 1234 | DEVICE 4 | DEVICE 1 | No Action |
| 12:22 1-4-14 | 12ver | 1S4Q | internet | 1234 | Upgrade phone | DEVICE 2 | No Action |
| 10:01 1-4-14 | 12ver | 2WPC | ATT | 1234 | Carrier deals | DEVICE 3 | No Action |
| 12:31 1-5-14 | 12ver | 2WPC | ATT | 1234 | Carrier deals | DEVICE 3 | Click |
| 08:01 1-6-14 | 12sprint | 1S4Q | internet | 1234 | New Device | DEVICE 2 | Click |
| 10:44 1-7-14 | 43wilson | 2WPC | ATT | 1234 | Tennis | DEVICE 3 | No Action |
| 12:56 1-8-14 | 2hawaii | 2WPC | ATT | 1234 | Travel | DEVICE 3 | Click |
| 10:48 1-9-14 | 46air | 1S4Q | internet | 1234 | Flights | DEVICE 2 | No Action |

FIG. 3

METHODS AND SYSTEMS FOR DETECTING DEVICE OR CARRIER CHANGE CONVERSIONS

BACKGROUND

In a computer networked environment such as the internet, third-party content providers provide third-party content items for display on end-user computing devices. These third-party content items, for example, advertisements, can be linked to web pages associated with the third-party content providers. These third-party content items can include content identifying the third-party content provider that provided the content item.

SUMMARY

At least one aspect is directed to a computer implemented method for detecting device or carrier change conversions based on device information and carrier information that is received with requests to provide content to communication devices in a computer network environment. According to one aspect, a method for detecting device or carrier change conversions based on device information and carrier information that is received with requests to provide content to communication devices is described. A data processing system including one or more processors identifies a first entry of a plurality of entries. Each entry of the plurality of entries identifies a content item provided for display, an action taken on the content item, a device identifier identifying a communication device on which the content item was provided for display, an account identifier identifying an account independent of the communication device and a carrier identifier identifying a carrier via which the communication device received the content item, each entry of the plurality of entries corresponding to the account identifier of the first entry. The data processing system identifies, from a subset of the plurality of entries, at least one of i) one or more validated device identifiers corresponding to the account identifier or ii) one or more validated carrier identifiers corresponding to the account identifier. The data processing system compares at least one of i) the device identifier of the first entry with the validated device identifiers or ii) the carrier identifier of the first entry with validated carrier identifiers. The data processing system determines that i) the device identifier of the first entry is different from the validated device identifiers or ii) the carrier identifier of the first entry is different from the validated carrier identifiers. The data processing system then identifies, from the plurality of entries corresponding to the account identifier, one or more content items previously provided for display that correspond to i) a device corresponding to the device identifier of the first entry responsive to determining that the device identifier of the first entry is different from the validated device identifiers, or ii) the carrier corresponding to the carrier identifier of the first entry via which the communication device received the content item responsive to determining that the carrier identifier of the first entry is different from the validated carrier identifiers.

In some implementations, the data processing system can determine one or more valid device identifiers or carrier identifiers corresponding to the account identifier. In some implementations, determining one or more valid device identifiers corresponding to the account identifier includes identifying, by the data processing system, a second entry of the plurality of entries, identifying a device identifier included in the second entry as a candidate valid device identifier, and indicating that the identified candidate device identifier is valid.

In some implementations, identifying a device identifier included in the second entry as a candidate valid device identifier includes identifying, from a subset of the plurality of entries corresponding to the account identifier, a number of entries including the device identifier included in the second entry, identifying, by the data processing system, one or more parameters of the entries including the device identifier, determining, by the data processing system, that the parameters of the entries satisfy a threshold and responsive to determining that the parameters of the entries satisfy a threshold, identifying, by the data processing system, that the device identifier included in the second entry is a valid device identifier.

In some implementations, determining one or more valid device identifiers corresponding to the account identifier includes identifying, for each entry of at least a subset of the plurality of entries, a device identifier included in the entry, determining, from the subset of the plurality of entries, a first number of entries that included the device identifier and responsive to determining that the first number of entries exceeds a threshold number of entries, identifying the device identifier as a valid device identifier.

In some implementations, determining one or more valid carrier identifiers corresponding to the account identifier includes identifying, by the data processing system, a second entry of the plurality of entries, identifying a carrier identifier included in the second entry as a candidate valid carrier identifier, and indicating that the identified candidate carrier identifier is valid.

In some implementations, identifying a carrier identifier included in the second entry as a candidate valid carrier identifier includes identifying, from a subset of the plurality of entries corresponding to the account identifier, a number of entries including the carrier identifier included in the second entry, identifying, by the data processing system, one or more parameters of the entries including the carrier identifier, determining, by the data processing system, that the parameters of the entries satisfy a threshold and responsive to determining that the parameters of the entries satisfy a threshold, identifying, by the data processing system, that the carrier identifier included in the second entry is a valid device identifier.

In some implementations, the data processing system can attribute credit to the identified one or more content items for a conversion based on the new device identifier or the new carrier identifier.

In some implementations, the data processing system can provide, for display, a metric to one or more content providers of the content items based on the credit attributed to the identified one or more content items for a conversion based on the new device identifier or the new carrier identifier.

In some implementations, the data processing system can receive a request to provide content, the request to provide content including the device identifier identifying the communication device to which to provide the content, the account identifier, and the carrier identifier identifying the carrier providing communication services to the communication device, provide, responsive to the request to provide content, a content item corresponding to one of a device type different from the communication device to which to provide the content or a carrier type different from the carrier providing communication services to the communication device and store, in a database, an entry corresponding to the content item provided for display in response to the request to provide content, the entry identifying the content item provided for display, at least one action taken on the content item, the device identifier, the account identifier and the carrier identifier associated with the request to provide content to which the entry corresponds, the database storing the plurality of entries corresponding to the account identifier.

At least one aspect is directed to a system of detecting device or carrier change conversions based on device information and carrier information that is received with requests to provide content to communication devices in a computer network environment. The system includes a data processing system including a content selection module, a conversion detection module and a content attribution module. The data processing system can be configured to identify a first entry of a plurality of entries. Each entry of the plurality of entries identifies a content item provided for display, an action taken on the content item, a device identifier identifying a communication device on which the content item was provided for display, an account identifier identifying an account independent of the communication device and a carrier identifier identifying a carrier via which the communication device received the content item, each entry of the plurality of entries corresponding to the account identifier of the first entry. The data processing system identifies, from a subset of the plurality of entries, at least one of i) one or more validated device identifiers corresponding to the account identifier or ii) one or more validated carrier identifiers corresponding to the account identifier. The data processing system compares at least one of i) the device identifier of the first entry with the validated device identifiers or ii) the carrier identifier of the first entry with validated carrier identifiers. The data processing system determines that i) the device identifier of the first entry is different from the validated device identifiers or ii) the carrier identifier of the first entry is different from the validated carrier identifiers. The data processing system then identifies, from the plurality of entries corresponding to the account identifier, one or more content items previously provided for display that correspond to i) a device corresponding to the device identifier of the first entry responsive to determining that the device identifier of the first entry is different from the validated device identifiers, or ii) the carrier corresponding to the carrier identifier of the first entry via which the communication device received the content item responsive to determining that the carrier identifier of the first entry is different from the validated carrier identifiers.

In some implementations, the data processing system can determine one or more valid device identifiers or carrier identifiers corresponding to the account identifier. In some implementations, determining one or more valid device identifiers corresponding to the account identifier includes identifying, by the data processing system, a second entry of the plurality of entries, identifying a device identifier included in the second entry as a candidate valid device identifier, and indicating that the identified candidate device identifier is valid.

In some implementations, identifying a device identifier included in the second entry as a candidate valid device identifier includes identifying, from a subset of the plurality of entries corresponding to the account identifier, a number of entries including the device identifier included in the second entry, identifying, by the data processing system, one or more parameters of the entries including the device identifier, determining, by the data processing system, that the parameters of the entries satisfy a threshold and responsive to determining that the parameters of the entries satisfy a threshold, identifying, by the data processing system, that the device identifier included in the second entry is a valid device identifier.

In some implementations, determining one or more valid device identifiers corresponding to the account identifier includes identifying, for each entry of at least a subset of the plurality of entries, a device identifier included in the entry, determining, from the subset of the plurality of entries, a first number of entries that included the device identifier and responsive to determining that the first number of entries exceeds a threshold number of entries, identifying the device identifier as a valid device identifier.

In some implementations, determining one or more valid carrier identifiers corresponding to the account identifier includes identifying, by the data processing system, a second entry of the plurality of entries, identifying a carrier identifier included in the second entry as a candidate valid carrier identifier, and indicating that the identified candidate carrier identifier is valid.

In some implementations, identifying a carrier identifier included in the second entry as a candidate valid carrier identifier includes identifying, from a subset of the plurality of entries corresponding to the account identifier, a number of entries including the carrier identifier included in the second entry, identifying, by the data processing system, one or more parameters of the entries including the carrier identifier, determining, by the data processing system, that the parameters of the entries satisfy a threshold and responsive to determining that the parameters of the entries satisfy a threshold, identifying, by the data processing system, that the carrier identifier included in the second entry is a valid device identifier.

In some implementations, the data processing system can attribute credit to the identified one or more content items for a conversion based on the new device identifier or the new carrier identifier.

In some implementations, the data processing system can provide, for display, a metric to one or more content providers of the content items based on the credit attributed to the identified one or more content items for a conversion based on the new device identifier or the new carrier identifier.

In some implementations, the data processing system can receive a request to provide content, the request to provide content including the device identifier identifying the communication device to which to provide the content, the account identifier, and the carrier identifier identifying the carrier providing communication services to the communication device, provide, responsive to the request to provide content, a content item corresponding to one of a device type different from the communication device to which to provide the content or a carrier type different from the carrier providing communication services to the communication device and store, in a database, an entry corresponding to the content item provided for display in response to the request to provide content, the entry identifying the content item provided for display, at least one action taken on the content item, the device identifier, the account identifier and the carrier identifier associated with the request to provide content to which the entry corresponds, the database storing the plurality of entries corresponding to the account identifier.

According to one aspect, a data processing system including one or more processors can receive a request to provide content, the request to provide content including a device identifier identifying a communication device to which to provide the content, an account identifier identifying an account agnostic to the communication device, and a carrier identifier identifying a carrier providing communication services to the communication device. The data processing system can provide, responsive to the request to provide content, a content item corresponding to one of a device type different from the communication device to which to provide the content or a carrier type different from the carrier providing communication services to the communication device. The data processing system can store, in a database, an entry corresponding to the content item provided for display in response to the request to provide content. The entry can identify the content item provided for display, any action taken on the content item, the device identifier, the account identifier and the carrier identifier associated with the request to provide content to which the entry corresponds. The database can store a plurality of entries corresponding to content items previously displayed in response to requests to provide content including the account identifier. The data processing system can identify, from the plurality of entries stored in the database, one or more device types matching a device type of the one or more communication devices to which to provide the content or one or more carrier types corresponding to the carrier providing communication services to the one or more communication devices. The data processing system can determine, from the plurality of entries, that a first subset of the plurality of entries corresponds to requests to provide content transmitted by a new device identifier corresponding to a device type different from the device types of the one or more communication devices to which to provide the content or a new carrier identifier. The data processing system can identify, from a second subset of the plurality of entries corresponding to requests to provide content made prior to requests to provide content of the first subset, one or more content items provided for display that are related to one of a device type corresponding to the new device identifier or a carrier corresponding to the new carrier identifier.

In some implementations, the data processing system can attribute credit to the identified one or more content items for a conversion based on the new device identifier or the new carrier identifier. In some implementations, the data processing system can provide, for display, a metric to one or more content providers of the content items based on the credit attributed to the identified one or more content items for a conversion based on the new device identifier or the new carrier identifier.

In some implementations, the request to provide content includes a search query that matches at least one keyword on which one or more content providers of the content items related to one of the device type or carrier submit bids. In some implementations, the request to provide content includes a request to access an information resource. In some implementations, the data processing system can identify one or more keywords associated with the information resource on which to serve the content. The data processing system can then match the identified keywords to at least one keyword on which one or more content providers of the content items related to one of the device type or carrier submit bids.

In some implementations, to identify one or more device types corresponding to the one or more devices to which to provide the content, the data processing system can identify a first set of entries corresponding to the account identifier and generated responsive to requests to provide content occurring within a first predetermined time period that ends prior to determining that the subset of the plurality of entries corresponds to requests to provide content transmitted by one of the new device identifier or the new carrier identifier. The data processing system can then identify, from the first set of entries, one or more device identifiers to which to provide the content as valid device identifiers. The data processing system can then generate a list of qualified device identifiers corresponding to the account identifier. The list of qualified device identifiers can include the one or more valid device identifiers.

In some implementations, the data processing system can identify, from the plurality of entries, a number of requests to provide content corresponding to a valid device identifier of the qualified device identifiers. The data processing system can then determine that the number of requests to provide content corresponding to the device identifier is less than a predetermined threshold and responsive to determining that the number of requests to provide content corresponding to the device identifier is less than the predetermined threshold, identify the device identifier as an invalid device identifier not suitable for inclusion in the list of qualified device identifiers In some implementations, the data processing system can identify one or more carrier types corresponding to the carrier providing communication services to the one or more communication devices by identifying a first set of entries corresponding to the account identifier and generated responsive to requests to provide content occurring within a first predetermined time period that ends prior to determining that the subset of the plurality of entries corresponds to requests to provide content including one of the new device identifier or the new carrier identifier. The data processing system can then identify, from the first set of entries, one or more carrier identifiers to which to provide the content as valid carrier identifiers. The data processing system can then generate a list of qualified carrier identifiers corresponding to the account identifier. The list of qualified carrier identifiers can include the one or more qualified carrier identifiers.

In some implementations, the data processing system can identify, from the plurality of entries, a number of requests to provide content corresponding to a valid carrier identifier of the valid carrier identifiers. The data processing system can determine that the number of requests to provide content corresponding to the carrier identifier is less than a predetermined threshold and responsive to determining that the number of requests to provide content is less than the predetermined threshold, exclude the carrier identifier from inclusion in the list of qualified carrier identifiers.

In some implementations, the data processing system can identify one or more content items provided for display that are related to one of a device type corresponding to the new device identifier or a carrier corresponding to the new carrier identifier by identifying that the content item was selected for display based on a keyword identifying the device type corresponding to the new device identifier or the carrier corresponding to the new carrier identifier.

In some implementations, the data processing system can identify one or more content items provided for display that are related to one of a device type corresponding to the new device identifier or a carrier corresponding to the new carrier identifier by identifying, from the content item, the device type corresponding to the new device identifier or the carrier corresponding to the new carrier identifier.

At least one aspect is directed to a system of detecting device or carrier change conversions based on device information and carrier information that is received with requests to provide content to communication devices in a computer network environment. The system includes a data processing system including a content selection module, a conversion detection module and a content attribution module. The data processing system can be configured to receive a request to provide content, the request to provide content including a device identifier identifying a communication device to which to provide the content, an account identifier identifying an account agnostic to the communication device, and a carrier identifier identifying a carrier providing communication services to the communication device. The data processing system can provide, responsive to the request to provide content, a content item corresponding to one of a device type different from the communication device to which to provide the content or a carrier type different from the carrier providing communication services to the communication device. The data processing system can store, in a database, an entry corresponding to the content item provided for display in response to the request to provide content. The entry can identify the content item provided for display, any action taken on the content item, the device identifier, the account identifier and the carrier identifier associated with the request to provide content to which the entry corresponds. The database can store a plurality of entries corresponding to content items previously displayed in response to requests to provide content including the account identifier. The data processing system can identify, from the plurality of entries stored in the database, one or more device types matching a device type of the one or more communication devices to which to provide the content or one or more carrier types corresponding to the carrier providing communication services to the one or more communication devices. The data processing system can determine, from the plurality of entries, that a first subset of the plurality of entries corresponds to requests to provide content transmitted by a new device identifier corresponding to a device type different from the device types of the one or more communication devices to which to provide the content or a new carrier identifier. The data processing system can identify, from a second subset of the plurality of entries corresponding to requests to provide content made prior to requests to provide content of the first subset, one or more content items provided for display that are related to one of a device type corresponding to the new device identifier or a carrier corresponding to the new carrier identifier.

In some implementations, the data processing system can attribute credit to the identified one or more content items for a conversion based on the new device identifier or the new carrier identifier. In some implementations, the data processing system can provide, for display, a metric to one or more content providers of the content items based on the credit attributed to the identified one or more content items for a conversion based on the new device identifier or the new carrier identifier.

In some implementations, the request to provide content includes a search query that matches at least one keyword on which one or more content providers of the content items related to one of the device type or carrier submit bids.

In some implementations, to identify one or more device types corresponding to the one or more devices to which to provide the content, the data processing system can identify a first set of entries corresponding to the account identifier and generated responsive to requests to provide content occurring within a first predetermined time period that ends prior to determining that the subset of the plurality of entries corresponds to requests to provide content transmitted by one of the new device identifier or the new carrier identifier. The data processing system can then identify, from the first set of entries, one or more device identifiers to which to provide the content as valid device identifiers. The data processing system can then generate a list of qualified device identifiers corresponding to the account identifier. The list of qualified device identifiers can include the one or more valid device identifiers.

In some implementations, the data processing system can identify, from the plurality of entries, a number of requests to provide content corresponding to a valid device identifier of the qualified device identifiers. The data processing system can then determine that the number of requests to provide content corresponding to the device identifier is less than a predetermined threshold and responsive to determining that the number of requests to provide content corresponding to the device identifier is less than the predetermined threshold, identify the device identifier as an invalid device identifier not suitable for inclusion in the list of qualified device identifiers In some implementations, the data processing system can identify one or more carrier types corresponding to the carrier providing communication services to the one or more communication devices by identifying a first set of entries corresponding to the account identifier and generated responsive to requests to provide content occurring within a first predetermined time period that ends prior to determining that the subset of the plurality of entries corresponds to requests to provide content including one of the new device identifier or the new carrier identifier. The data processing system can then identify, from the first set of entries, one or more carrier identifiers to which to provide the content as valid carrier identifiers. The data processing system can then generate a list of qualified carrier identifiers corresponding to the account identifier. The list of qualified carrier identifiers can include the one or more qualified carrier identifiers.

In some implementations, the data processing system can identify, from the plurality of entries, a number of requests to provide content corresponding to a valid carrier identifier of the valid carrier identifiers. The data processing system can determine that the number of requests to provide content corresponding to the carrier identifier is less than a predetermined threshold and responsive to determining that the number of requests to provide content is less than the predetermined threshold, exclude the carrier identifier from inclusion in the list of qualified carrier identifiers.

In some implementations, the data processing system can identify one or more content items provided for display that are related to one of a device type corresponding to the new device identifier or a carrier corresponding to the new carrier identifier by identifying that the content item was selected for display based on a keyword identifying the device type corresponding to the new device identifier or the carrier corresponding to the new carrier identifier.

In some implementations, the data processing system can identify one or more content items provided for display that are related to one of a device type corresponding to the new device identifier or a carrier corresponding to the new carrier identifier by identifying, from the content item, the device type corresponding to the new device identifier or the carrier corresponding to the new carrier identifier.

At least one aspect is directed to a computer readable storage medium storing instructions that when executed by one or more data processors, cause the one or more data processors to perform operations. The data processing system can receive a request to provide content, the request to provide content including a device identifier identifying a communication device to which to provide the content, an account identifier identifying an account agnostic to the communication device, and a carrier identifier identifying a carrier providing communication services to the communication device. The data processing system can provide, responsive to the request to provide content, a content item corresponding to one of a device type different from the communication device to which to provide the content or a carrier type different from the carrier providing communication services to the communication device. The data processing system can store, in a database, an entry corresponding to the content item provided for display in response to the request to provide content. The entry can identify the content item provided for display, any action taken on the content item, the device identifier, the account identifier and the carrier identifier associated with the request to provide content to which the entry corresponds. The database can store a plurality of entries corresponding to content items previously displayed in response to requests to provide content including the account identifier. The data processing system can identify, from the plurality of entries stored in the database, one or more device types matching a device type of the one or more communication devices to which to provide the content or one or more carrier types corresponding to the carrier providing communication services to the one or more communication devices. The data processing system can determine, from the plurality of entries, that a first subset of the plurality of entries corresponds to requests to provide content transmitted by a new device identifier corresponding to a device type different from the device types of the one or more communication devices to which to provide the content or a new carrier identifier. The data processing system can identify, from a second subset of the plurality of entries corresponding to requests to provide content made prior to requests to provide content of the first subset, one or more content items provided for display that are related to one of a device type corresponding to the new device identifier or a carrier corresponding to the new carrier identifier.

In some implementations, the data processing system can attribute credit to the identified one or more content items for a conversion based on the new device identifier or the new carrier identifier. In some implementations, the data processing system can provide, for display, a metric to one or more content providers of the content items based on the credit attributed to the identified one or more content items for a conversion based on the new device identifier or the new carrier identifier.

In some implementations, the request to provide content includes a search query that matches at least one keyword on which one or more content providers of the content items related to one of the device type or carrier submit bids.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is a table including entries relating to content items served to one or more communication devices, according to an illustrative implementation;

DETAILED DESCRIPTION

Figure 1:
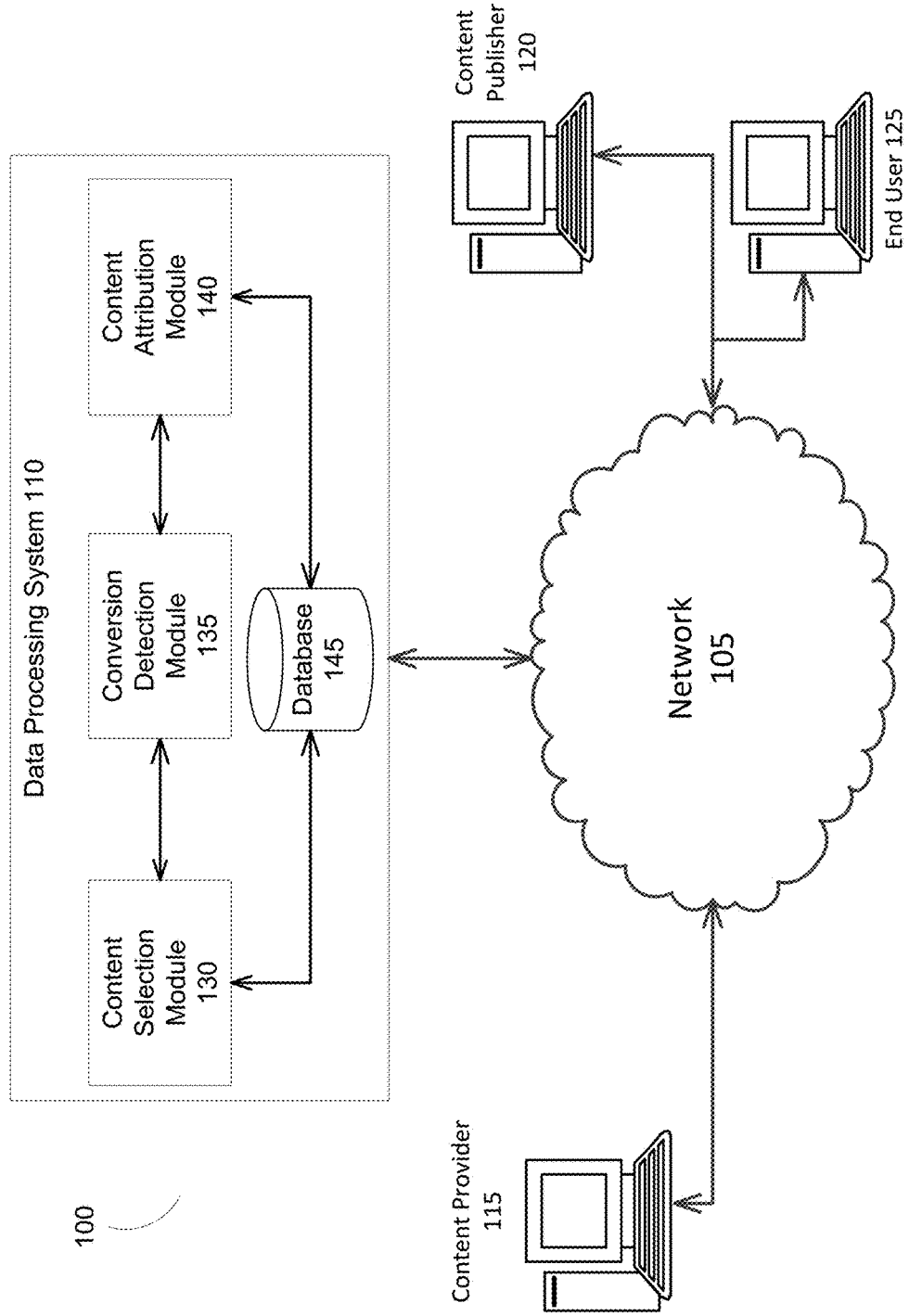
FIG. 1 is a block diagram depicting one implementation of an environment for detecting device or carrier change conversions based on device information and carrier information that is received with requests to provide content to communication devices, according to an illustrative implementation.

Following below are more detailed descriptions of various concepts related to, and implementations of, methods, apparatuses, and systems of detecting device or carrier change conversions based on device information and carrier information that is received with requests to provide content to communication devices in a computer network environment. The various concepts introduced above and discussed in greater detail below may be implemented in any of numerous ways, as the described concepts are not limited to any particular manner of implementation.

Advertisers that manufacture or sell communication devices on which an online advertising system provides online ads for display are interested in tracking conversions to understand the strengths, weaknesses, and results of their advertising campaigns. Similarly, advertisers that provide communication services to such communication devices are also interested in tracking conversions to understand the strengths, weaknesses, and results of their advertising campaigns. At present, the only way an advertiser may be able to determine if an online ad results in a conversion is if the user clicks on the ad and purchases a communication device or subscribes to a carrier via the online ad. Advertisers, generally however, are unable to determine the effect their online ad campaigns have on users viewing their online ads as there is no way to determine if a user of a communication device on which the online ad was shown ends up purchasing a new communication device or switches carriers due to the online ad.

Some advertisers may advertise on device queries, such as the APPLE IPHONE, MACBOOK, SAMSUNG GALAXY S5, IPAD, among others, or carrier specific queries, such as cell phone plans, mobile phone plans, AT&T, TMOBILE, family plans, among others. For these queries, the advertising system can provide immense value to the advertiser by monitoring a metric that detects how many times a particular user submitted search queries for a communication device or carrier, clicked on an ad and eventually bought the device or changed the carrier. In some implementations, the advertising system can identify a first communication device used by the user, then identify that the user submits a search query or interacts with an ad related to a second communication device and then identify that the user is now using the second device. In some implementations, the advertising system can identify that a user is currently using a first carrier, identify that the user submits a search query or interacts with an ad related to carriers or services provided by carriers, and then identify that the user is now using a second carrier.

By analyzing these queries and interactions and the devices and carriers to which these queries and interactions correspond, the advertising system can provide relevant advertising campaign information to advertisers that manufacture or sell communication devices as well as advertisers that sell carrier plans and services. Advertisers can use the advertising campaign information to make better decisions on the execution of their advertising campaigns, including but not limited to identifying which ads result in greater conversions, which types of users to send ads to, among others.

Advertisers can bid on device or carrier related keywords via the advertising system. In general, when a user requests content, for example, by submitting a search query, the advertising system can select and provide an ad for display based on a relevance between the query and one or more keywords. Ads of advertisers bidding on keywords related to devices or carriers are likely to be provided to users submitting search queries relating to devices or carriers based on the relevance between the search queries and keywords.

The advertising system can identify the type of device and the carrier the user is using to submit the search query. The advertising system may maintain a database that includes entries for each query and store the device type and carrier information associated with the search query. The advertising system can use the information stored in the database, to identify, for a given user, whether the user has changed their device or their carrier.

The database can also store one or more ads that were provided for display to the user responsive to the search queries as well as interactions the user had with the ads that were provided for display. The advertising system can then, in response to determining that the user has changed their device or their carrier, identify one or more content items related to the new device or carrier with which the user interacted, and attribute credit for the conversion to the new device or carrier to the content item with which the user interacted.

Systems and methods of the present disclosure relate generally to detecting device or carrier change conversions based on device information and carrier information that is received with requests to provide content to communication devices. A data processing system of the advertising system can receive a request to provide content to a communication device of a user. The request to provide content can include various types of information, including a device identifier identifying the communication device to which to provide the content, an account identifier identifying an account of a user, a carrier identifier identifying a carrier providing communication services to the communication device, a time at which the request to provide content was transmitted or received, among others. A device type, for example, the manufacturer and model of the device, can be determined from the device identifier of the communication device.

The data processing system provides a content item corresponding to one of a device type different from the communication device to which to provide the content item or a carrier type different from the carrier providing communication services to the communication device. The data processing system can provide the content item in response to the request to provide content. In some implementations, the data processing system can select the content item based on the content of the request, for example, a search query included in the request.

The data processing system can store, in a database, an entry corresponding to the content item provided for display. The entry can identify the content item provided for display, any action taken on the content item, the device identifier, the account identifier and the carrier identifier associated with the request to provide content to which the entry corresponds. The database can include a plurality of entries corresponding to the account identifier. Each of the plurality of entries can correspond to one or more content items previously provided for display in response to requests to provide content including the account identifier.

The data processing system can then identify, from the plurality of entries stored in the database, one or more device types matching a device type of the one or more communication devices to which to provide the content or one or more carrier types corresponding to the carriers providing communication services to the one or more communication devices. In some implementations, the data processing system can determine the device type from the device identifier. The device type can be identify the category or type of the device, the make and model of the device, as well as a color, size or other features of the device. In some implementations, the data processing system can determine the carrier by determining that a predetermined number of entries include the carrier identifier identifying the carrier.

The data processing system can determine, from the plurality of entries, that a first subset of the plurality of entries corresponds to requests to provide content to a communication device having a new device identifier corresponding to a device type different from the device types of the one or more communication devices to which content items were previously provided or a new carrier identifier providing communication services to communication devices of the account identifier. The data processing system can do so by determining a device identifier or carrier identifier associated with the first subset of entries. Stated in another way, the data processing system can identify a first subset of entries that identify a device identifier corresponding to a new communication device. The new communication device can be a communication device not previously associated with the particular account identifier corresponding to the plurality of entries. By determining that the account identifier is now associated with a new device identifier, the data processing system can identify one or more ads shown to the user of the account identifier that may have attributed to the user now using the new device identifier. In some implementations, the data processing system can implement checks and balances to ensure that the communication device is a device the user now regularly uses indicating that the user has bought the device instead of simply borrowing the device or the device being accessible to the public.

The data processing system can identify, from a second subset of the plurality of entries corresponding to requests to provide content made prior to requests to provide content of the first subset, one or more content items provided for display that are related to one of a device type corresponding to the new device identifier or a carrier corresponding to the new carrier identifier. The data processing system can determine activity associated with the content items. The activities can include click throughs, hover-overs, having the content item be displayed on the screen for a predetermined length of time, among others.

In some implementations, the data processing system can assign or attribute credit to the identified one or more content items for a conversion based on the new device identifier or the new carrier identifier. In some implementations, the data processing system can provide, for display, a metric to one or more content providers of the content items based on the credit attributed to the identified one or more content items for a conversion based on the new device identifier or the new carrier identifier.

Although the present disclosure describes determining a device or carrier change based on search queries and information of the device and carrier included in the search queries, it should be appreciated that the present disclosure is not limited to the same. Rather, the present disclosure also relates to methods and systems for determining or detecting a device or carrier change based on any request for content made from a particular device by analyzing the device identifier, carrier identifier and account identifier associated with requests for content. The requests for content can be search queries. The requests for content can be access to a particular web page or information resource. In some implementations, the requests for content can be a request to access a web page responsive to clicking on a link, or entering a URL in a browser. In some such implementations, content items served to the device can be based on keywords associated with the web page or information resource being accessed. For instance, if the web page is related to tennis racquets, the keyword on which advertisers may bid to serve content on the web page may include "tennis," "tennis racquet," "racquet sports," among others. As such, the present disclosure is not intended to be limited to search queries even though the descriptions provided herein relate generally to search queries.

FIG. 1 is a block diagram depicting one implementation of an environment for detecting device or carrier change conversions based on device information and carrier information that is received with requests to provide content to communication devices. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one end user computing device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CATS cable, etc.) to other computing devices in network 105.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The end user computing devices 125 can be communication devices through which an end user can submit requests to receive content. The requests can be requests to a search engine and the requests can include search queries. In some implementations, the requests can be a request to access a web page. In some implementations, the end user computing devices 125 can be communication devices through which advertisers can create, manage, and access advertising campaign data.

The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one content selection module 130, at least one conversion detection module 135, at least one content attribution module 140 and at least one database 145. The content selection module 130, the conversion detection module 135 and the content attribution module 140 can each include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the end user computing device 125) via the network 105.

The content selection module 130, the conversion detection module 135 and the content attribution module 140 can include or execute at least one computer program or at least one script. The content selection module 130, the conversion detection module 135 and the content attribution module 140 can be separate components, a single component, or part of the data processing system 110. The content selection module 130, the conversion detection module 135 and the content attribution module 140 can include combinations of software and hardware, such as one or more processors configured to execute one or more scripts to a) receive a request to provide content to a communication device, the request to provide content including a device identifier identifying the communication device to which to provide the content, an account identifier identifying an account agnostic to the communication device, and a carrier identifier identifying a carrier providing communication services to the communication device, b) provide, responsive to the request to provide content, a content item corresponding to one of a device type different from the communication device to which to provide the content or a carrier type different from the carrier providing communication services to the communication device, c) store, in a database, an entry corresponding to the content item provided for display in response to the request to provide content, the entry identifying the content item provided for display, any action taken on the content item, the device identifier, the account identifier and the carrier identifier associated with the request to provide content to which the entry corresponds, the database storing a plurality of entries corresponding to the account identifier and to content items previously displayed in response to requests to provide content that include the account identifier, d) identify, from the plurality of entries stored in the database, one or more device types matching a device type of the one or more communication devices to which to provide the content or one or more carrier types corresponding to the carrier providing communication services to the one or more communication devices, e) determine, from the plurality of entries, that a first subset of the plurality of entries corresponds to requests to provide content transmitted by a new device identifier corresponding to a device type different from the device types of the one or more communication devices to which to provide the content or a new carrier identifier and f) identify, from a second subset of the plurality of entries corresponding to requests to provide content made prior to requests to provide content of the first subset, one or more content items provided for display that are related to one of a device type corresponding to the new device identifier or a carrier corresponding to the new carrier identifier, for example.

The data processing system can also include one or more content repositories or databases 145. The databases 145 can be local to the data processing system 110. In some implementations, the databases 145 can be remote to the data processing system 110 but can communicate with the data processing system 110 via the network 105. The databases 145 can store tables. Each table can correspond to a particular account identifier. The account identifier can be unique to a particular user and can be agnostic to a particular communication device or carrier such that a user can be associated with the same account identifier even if the request to provide content correspond to different communication device identifiers or carrier identifiers. The databases can store tables for a plurality of account identifiers. In some implementations, the databases 145 can store tables for each advertiser. Additional details of the contents of the databases 145 will be provided below.

Figure 2:
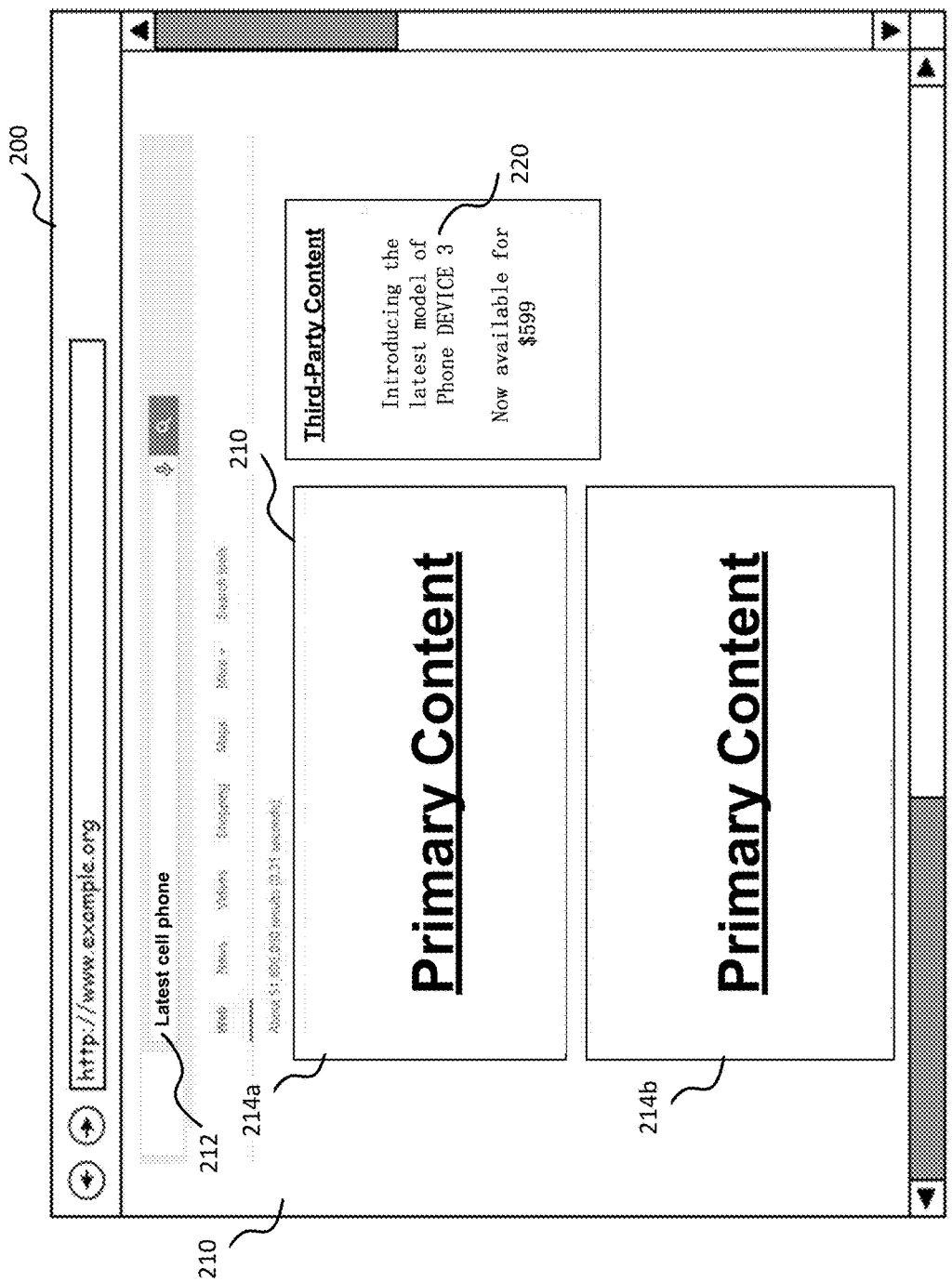
FIG. 2 is a display depicting an online search result document including a third-party content item identifying a new communication device, according to an illustrative implementation.

Referring now to FIG. 2, FIG. 2 is a display depicting an online search result document including a third-party content item identifying a new communication device, according to an illustrative implementation. The document 210 is displayed on a user interface 200 at an end user computing device 125, such as a communication device of the user. The communication device can be any electronic computing device, including but not limited to laptops, smartphones, tablets, desktops, phablets, among others. The document 210 can include a search query 212, which can be provided to request content for display on the document 210. In response to the search query, one or more primary content items 214a-214b are provided for display based on the search query. In addition, the data processing system can provide third-party content, such as an advertisement 220 for display alongside the primary content. The advertisement 220 can be selected by the data processing system in response to an auction based on a keyword. The keyword on which the auction is performed can be based on or match the search query 212. In some implementations, the advertisement 212 can be an advertisement of an advertiser that provided the highest bid in the auction. The user may take an action on the advertisement 220, for example, click on it. In some implementations, the user may take no action on the advertisement 220. In some implementations, the advertisement will receive a valid impression if the advertisement is displayed for longer than a predetermined time period, for example, 2 seconds. In some implementations, the advertiser whose ad is selected for display may bid higher for requests to provide content to communication devices that are different from the communication device the advertiser is promoting. For instance, the auction can be an auction to serve an ad on a communication device having a manufacturer and model type of "DEVICE 1." An advertiser promoting "DEVICE 3" may set up an advertising campaign to bid a certain amount for auctions to serve an ad on any communication device "DEVICE 1" based on search queries corresponding to the keywords "phone," "smartphone," "cell phone" and "DEVICE 2," "DEVICE 3" and "DEVICE 4."

FIG. 3 is a table including entries relating to content items served to one or more communication devices, according to an illustrative implementation. The table 300 includes a plurality of fields, including but not limited to time stamp 312, content ID 314, device ID 316, carrier ID 318, account ID 320, query/keyword 322, device type 324 and action type 326. The table also includes a plurality of entries 322a-332n (hereinafter entries 322). The entries can be arranged in chronological order starting with the earliest. The table 300 is specific to a particular account identifier 1234. Each of the account identifiers may have a similar table including entries corresponding to the specific account identifier. In some implementations, the table 300 can be derived from a database including a log of each content item served by the data processing system to devices associated with a plurality of account identifiers. As shown in the table 300, a user associated with an account identifier 1234 receives content on two devices (DEVICE 1 and DEVICE 2) corresponding to device identifiers 1S2Q and 1S4Q. Device 1 receives cellular data services via the carrier Tmobile. After several content items (identified as 1234*att*, 1235*att*, 1236*sprint* and 12*ver*) are provided for display, the account identifier 1234 receives content on a new device identifier 2WPC, which corresponds to the DEVICE 3 over a different carrier (ATT). The data processing system can determine that the user associated with the account ID 1234 switched devices from DEVICE 1 to DEVICE 3 and switched carriers from Tmobile to ATT. As can be seen from the table 300, one or more of the content items 1234*att*, 1235*att*, 1236*sprint* and 12*ver* may be attributed credit for the conversion. Both 1234*att* and 1235*att* may be content items related to the carrier ATT. In some implementations, the content item 1234*att* may be attributed a greater credit than the content item 1235*att* as the user clicked on the content item 1234*att* and took no action on the content item 1235*att*. Each of the content items were selected for display based in part on the query included in the request for content. In some implementations, the query is matched to a keyword on which advertisers bid on. In some implementations, the entries include the keyword on which the advertiser whose content item was selected for display bid. Details regarding the attribution of credits for the conversion to the one or more content items is provided below with respect to FIGS. 1 and 4.

As described above, the data processing system can determine that the user associated with the account ID 1234 switched devices from DEVICE 1 to DEVICE 3 and switched carriers from Tmobile to ATT. In some implementations, the data processing system 110 may determine if the device switch or carrier switch is an actual device switch or carrier switch based on one or more factors. For instance, the data processing system 110 can see if the requests for content made using the new device or new carrier service occurred over an extended sustained period of time. As shown in FIG. 3, the entry 332c corresponds to the first time the user used Device ID "2WPC" on Jan. 4, 2014. Additional entries associated with the Account ID "1234" and corresponding to the Device ID "2WPC" are created based on content searches on January 5, January 7, and January 8. The data processing system 110 can determine that as the user has used the device on multiple occasions between January 4-8, the user is likely to have switched to this device. In some implementations, the data processing system 110 can determine that the user has switched based on a number of searches made from the device, the times of day of the searches, the number of days over which the searches were made, the gap between consecutive searches (if searches are not made on weekends, it can be determined that the device is an office or work related device), among others.

Referring again also to FIG. 1, the content selection module 130 can be configured to receive a request to provide content to an end user computing device 125, such as a communication device of an end user requesting content. The request to provide content can include a search query. In some implementations, the request to provide content received by the content selection module 130 can be generated in response to receiving a request to provide primary content from the communication device. In some implementations, the request to provide content received by the content selection module 130 can be generated in response to receiving a request to provide search query results from a communication device. In some implementations, the request to provide content received by the content selection module 130 includes the search query for which the search query results are requested. In some implementations, the request to provide content can be based on a search query related to communication devices or carriers. In some implementations, the search query can be a search query for communication device-related queries, such as the APPLE IPHONE, NEXUS, MACBOOK, ANDROID, SAMSUNG GALAXY S5, IPAD, among others, or carrier specific queries, such as cell phone plans, mobile phone plans, AT&T, TMOBILE, family plans, among others.

The request to provide content can include one or more of a device identifier, such as device ID 316, identifying the communication device to which to provide the content, an account identifier, such as account ID 320, identifying an account agnostic to the communication device, and a carrier identifier, such as carrier ID 318, identifying a carrier providing communication services to the communication device. In some implementations, the device identifier 316 can be the International Mobile Station Equipment Identity (IMEI) of the device. In some implementations, through the device identifier 316, the content selection module 130 can determine the type of device (device type 324), for example, a laptop, mobile phone, tablet, phablet, among others. In some implementations, the type of device may be more granular and can identify one or more of the model, make and manufacturer of the communication device. In some implementations, the device identifier 316 can be any identifier that can be used to identify the model, make and manufacturer of the communication device. In some implementations, the device identifier 316 can be a hash or other function of any identifier that uniquely identifies the communication device. In some implementations, the device identifier can be based on one or more of a Subscriber Identity Module (SIM), network interface identifier, or any other identifier that is unique to the device.

The account identifier 320 included in the request can be a cookie or other identifier associated with a particular account of an application, browser, or other entity executing on the device. In some implementations, the account identifier 320 can be associated with a social networking platform. In some implementations, the account identifier can be used to identify a particular user of a device such that if multiple users utilize the same communication device, the content selection module 130 can distinguish between the multiple users through the account identifier. In some implementations, the account identifier may include sign-in information of a particular user.

The carrier identifier 318 included in the request can be an identifier that provides communication services to the communication device. The carrier identifier 318 can be provided by the carrier. In some implementations, the carrier identifier can be unique to the communication device. In some implementations, the carrier identifier can be generic to multiple communication devices that utilize the same carrier. In some implementations, the carrier identifier can be based on a network interface of the communication device through which the communication device receives communication services of the provider. In some implementations, a communication device can have one or more carrier identifiers. The carrier identifier included in the request is based on the carrier providing communication services through which the requested content is provided to the communication device. In some implementations in which the request does not include the carrier identifier, the content selection module 130 can determine the carrier through which the communication device transmitted the request. In some implementations, the content selection module 130 can determine the carrier based on a location of the communication device, routing information included in the request, among others.

The content selection module 130 can be configured to provide, responsive to the request to provide content, a content item corresponding to one of a device type different from the communication device to which to provide the content or a carrier type different from the carrier providing communication services to the communication device. In some implementations, the content selection module 130 can be configured to select the content item to provide, for presentation at the communication device associated with the request to provide content. In some implementations, the content selection module 130 can select a content item based on the contents of the request to provide content, including but not limited to the search query, the device identifier, the carrier identifier, among others. In some implementations, the content selection module 130 can select the content item based on an auction for serving content to the communication device. The auction can be based on a keyword that matches or is related to the search query included in the request to provide content. In some implementations, the content selection module 130 can identify the search query, match the search query to one or more keywords on which advertisers are willing to bid, and then run an auction on the matched keywords. In some implementations, an advertiser supplying content related to a second communication device different from the communication device identified by the device identifier included in the request may seek to bid higher to display the content related to the second communication device based on the search query included in the request and the type of communication device identified by the device identifier. In some implementations, an advertiser supplying content related to a second carrier different from the carrier identified by the carrier identifier included in the request may seek to bid higher to display the content related to the second carrier based on the search query included in the request and the carrier identified by the carrier identifier.

The content selection module 130 can store an entry corresponding to the content item provided for display in a database, such as the database 145. In some implementations, the content selection module 130 can store, in the database, the entry corresponding to the content item provided for display in response to identifying the content to provide to the communication device based on the request to provide content. The entry can identify the content item provided for display, any action taken on the content item, the device identifier, the account identifier and the carrier identifier included in the request to provide content to which the entry corresponds. In some implementations, the database 145 can store a plurality of entries corresponding to content items previously displayed in response to requests to provide content including the account identifier. In some implementations, the database can include a plurality of tables. In some implementations, each table can correspond to a particular account identifier 320. Each table can include a plurality of entries corresponding to content provided to communication devices associated with the account identifier of the table.

Each entry can include a plurality of fields. In some implementations, each entry can include one or more values based on the plurality of fields. Examples of the fields can include the timestamp 312 at which the content item was provided for display or the request to provide content was received, the content identifier 314 identifying the content item provided for the display, the device identifier 316 corresponding to the communication device to which the content item was provided, the carrier identifier 318 corresponding to the carrier providing service to the communication device, the account identifier 320 corresponding to an account associated with a browser, application or other entity of the communication device, keyword or query data 322, location data associated with the communication device, the device type 324 and the action type 326 corresponding to the type of action taken on the content item. The content selection module 130 can update the database to include a new entry each time a content item is served. In some implementations, the content selection module 130 can update the entry to include the action type responsive to an action taken at the communication device.

The conversion detection module 135 can be configured to identify, from the plurality of entries stored in the database, one or more device types matching a device type of the one or more communication devices to which to provide the content or one or more carrier types corresponding to the carrier providing communication services to the one or more communication devices. In some implementations, the database 145 can include a plurality of entries corresponding to requests to provide content to communication devices associated with a particular account identifier. In some implementations, the database can include entries corresponding to multiple account identifiers. In some implementations, the conversion detection module 135 can identify a portion of the entries that correspond to a particular account identifier.

In some implementations, the conversion detection module 135 can be configured to execute a script, algorithm, program or functionality to identify any account identifier that is included in entries in which a new device identifier or carrier identifier has been included. A new device identifier or carrier identifier can be a device identifier or carrier identifier that has previously not been associated or included in entries included in the account identifier. Stated in another way, if entries corresponding to the account identifier have historically been associated with a particular carrier identifier and a particular communication device, and then the database includes entries corresponding to the same account identifier now include a new device identifier or a new carrier identifier, the conversion detection module 135 can determine that the account identifier is receiving content via a new device or new carrier.

In some implementations, the conversion detection module 135 can be configured to identify, from the plurality of entries corresponding to a particular account identifier, one or more communication devices linked to the account identifier. Similarly, the conversion detection module 135 can identify, from the plurality of entries corresponding to a particular account identifier, one or more communication devices linked to the account identifier. From these entries, the conversion detection module 135 can generate a list of communication devices and carriers the account identifier uses to receive content. In some implementations, the list of communication devices and carriers can include device identifiers and carrier identifiers. In some implementations, the list of communication devices and carriers can include the types of communication devices, for example, the make, manufacturer and model of the communication devices, and the carrier types, for example, the identity of the carrier providing communication services to the communication devices through which the account identifier receives content.

The conversion detection module 135 can be configured to identify entries corresponding to a particular account identifier that have a timestamp within a predetermined time period. In some implementations, the conversion detection module 135 can identify entries in which content was provided to communication devices associated with the account identifier within the past week, month, few months, or year. In some implementations, the conversion detection module 135 can periodically update the list of communication devices and carriers generated for each account identifier. In some implementations, the conversion detection module 135 can update the list of communication devices and carriers generated for each account identifier every day, week, month, among others.

The conversion detection module 135 can be configured to determine, from the plurality of entries, that a first subset of the plurality of entries corresponding to the account identifier corresponds to requests to provide content to a new device identifier corresponding to a device type different from the device types of the one or more communication devices to which to provide the content. In some implementations, the conversion detection module 135 can be configured to determine, from the plurality of entries, that a first subset of the plurality of entries corresponding to the account identifier corresponds to requests to provide content to a communication device corresponding to a new carrier identifier different from the carrier types of the one or more carriers providing communication services to the one or more communication devices included in the list of communication devices associated with the account identifier.

In some implementations, the conversion detection module 135 can identify, from the plurality of entries corresponding to the account identifier, one or more entries that include the same account identifier but include a device identifier not included in the list of device identifiers. Such entries may indicate that a user associated with the account identifier used a device different from other communication devices the account identifier has previously used in the past to receive content. To identify the entries that include the same account identifier but include a device identifier not included in the list of device identifiers, the conversion detection module 135 can use filters on the database to identify only those entries that include the account identifier but use a device identifier different from any of the device identifiers included in the list of device identifiers generated by the conversion detection module 135.

In some implementations, the conversion detection module 135 can identify, from the plurality of entries corresponding to the account identifier, one or more entries that include the same account identifier but include a carrier identifier not included in the list of device identifiers. Such entries indicate that a user associated with the account identifier used a carrier different from other carriers communication devices associated with the account identifier had previously used in the past to receive content. To identify the entries that include the same account identifier but include a carrier identifier not included in the list of carrier identifiers, the conversion detection module 135 can use filters on the database to identify only those entries that include the account identifier but use a carrier identifier different from any of the carrier identifiers included in the list of carrier identifiers generated by the conversion detection module 135.

In some implementations, the conversion detection module 135 can identify one or more device types corresponding to the one or more communication devices to which to provide the content by identifying a first set of entries corresponding to the account identifier. The first set of entries can be generated responsive to requests to provide content made within a first predetermined time period that ends prior to determining that the subset of the plurality of entries corresponds to requests to provide content including the new device identifier. The conversion detection module 135 can then identify, from the first set of entries, one or more device identifiers to which to provide the content as valid device identifiers and generate a list of qualified device identifiers corresponding to the account identifier including the one or more valid device identifiers. A valid device identifier can include device identifiers that the account identifier has been associated with in previous entries. In some implementations, a device identifier can be determined to be valid if more than a predetermined number of entries including the same account identifier also include the device identifier. In some implementations, a user may occasionally use a communication device that is not a communication device that they normally use. For instance, the user may use a communication device at a public library, or at an electronics store, or at a friend's house. To prevent the conversion detection module 135 from determining that the user switched to a new communication device when the user uses a communication device on a temporary basis, the conversion detection module 135 can implement some checks and balances. For instance, the conversion detection module 135 can require the device identifier of the new communication device to be included in more than predetermined number of requests to provide content. In some implementations, the conversion detection module 135 can require the device identifier to be included in requests from more than a predetermined number of geographic locations. In some implementations, the conversion detection module 135 can require the device identifier to be included in requests over a plurality of time periods, for example, over 3 different 24 hour periods.

In some implementations, the conversion detection module 135 can identify, from the plurality of entries, a number of requests to provide content corresponding to a valid device identifier of the qualified device identifiers. The conversion detection module 135 can determine that the number of requests to provide content corresponding to the device identifier is less than a predetermined threshold. The conversion detection module 135 can then identify the device identifier as an invalid device identifier not suitable for inclusion in the list of qualified device identifiers responsive to determining that the number of requests to provide content corresponding to the device identifier is less than the predetermined threshold.

In some implementations, the conversion detection module 135 can identify one or more device types corresponding to the one or more communication devices to which to provide the content by identifying a first set of entries corresponding to the account identifier. The first set of entries can be generated responsive to requests to provide content made within a first predetermined time period that ends prior to determining that the subset of the plurality of entries corresponds to requests to provide content including the new carrier identifier. The conversion detection module 135 can identify, from the first set of entries, one or more carrier identifiers to which to provide the content as valid carrier identifiers and generate a list of qualified carrier identifiers corresponding to the account identifier. The list of qualified carrier identifiers can include the one or more qualified carrier identifiers.

In some implementations, the conversion detection module 135 can identify, from the plurality of entries, a number of requests to provide content corresponding to a valid carrier identifier of the valid carrier identifiers. The conversion detection module 135 can determine that the number of requests to provide content corresponding to the carrier identifier is less than a predetermined threshold. The conversion detection module 135 can then exclude the carrier identifier from inclusion in the list of qualified carrier identifiers responsive to determining that the number of requests to provide content including the new carrier identifier is less than the predetermined threshold.

The content attribution module 140 can be configured to identify, from a second subset of the plurality of entries corresponding to requests to provide content made prior to requests to provide content of the first subset, one or more content items provided for display that are related to one of a device type corresponding to the new device identifier or a carrier corresponding to the new carrier identifier. In some implementations, the content attribution module 140 can identify a second subset of the plurality of entries that correspond to requests to provide content that were received prior to the requests to provide content corresponding to the first subset of the plurality of entries. The first subset of the plurality of entries correspond to entries in which the either the device identifier included in the request or the carrier identifier included in the request is different from the device identifiers or carrier identifiers included in previous requests to provide content possibly indicating that the user already switched devices or carriers. The second subset of the plurality of entries can correspond to entries that do not include one or more of the device identifier or carrier identifier included in the entries of the first subset indicating that the user had not already switched devices or carriers. The second subset of the plurality of entries can therefore correspond to content items displayed to the user of the account identifier that may have influenced the user to switch devices or carriers.

Responsive to identifying the second subset of the plurality of entries, the content attribution module 140 can be configured to identify the content items provided in response to the requests to provide content. In some implementations, the content attribution module 140 can identify, from the plurality of identified content items, one or more content items that are related to one of a device type corresponding to the new device identifier or a carrier corresponding to the new carrier identifier. In some implementations, the content attribution module 140 can identify one or more content items provided for display that are related to one of a device type corresponding to the new device identifier or a carrier corresponding to the new carrier identifier by identifying that the content item was selected for display based on a keyword identifying the device type corresponding to the new device identifier or the carrier corresponding to the new carrier identifier.

The content attribution module 140 can determine that a particular content item is related to a device type corresponding to the new device identifier by analyzing the content item itself, the landing page of the content item, the advertiser providing the content item, among others. Similarly, the content attribution module 140 can determine that a particular content item is related to a carrier type corresponding to the new carrier identifier by analyzing the content item itself, the landing page of the content item, the advertiser providing the content item, among others. In some implementations, the content attribution module 140 can determine that the content item is related to the device type of the new device identifier by first identifying the device type of the new device identifier and matching text in the content item or the landing page of the content item to the device type.

In some implementations, the content attribution module 140 can identify one or more content items provided for display that are related to one of a device type corresponding to the new device identifier or a carrier corresponding to the new carrier identifier by identifying, from the content item, the device type corresponding to the new device identifier or the carrier corresponding to the new carrier identifier.

In some implementations, the content attribution module 140 can identify only those content items on which an action was taken. For example, the content attribution module 140 can identify content items on which the user associated with the account identifier clicked or took some other action. In some implementations, the content attribution module 140 can identify content items that were provided for display that received a valid impression. In this way, even if the user did not take an action on the content item but was shown the content item, credits due to a conversion may be attributed to the content item.

The content attribution module 140 can be configured to attribute credit to the identified one or more content items for a conversion based on the new device identifier or the new carrier identifier. In some implementations, the content attribution module 140 can attribute credit responsive to identifying a conversion path identifying the one or more content items that contributed to the conversion. A content item may be determined to contribute towards the conversion if the content item receives a valid impression. In some implementations, the content item may be determined to contribute towards the conversion if the content item receives an action, such as a click. In some implementations, the amount of credit attributed to the content item may be based on a type of action taken on the content item. For instance, the amount of credit attributed to a content item that received a valid impression but not a click can be less than a content item that received a click. In some implementations, the amount of credit attributed to a content item can be based on the conversion funnel and the position of the content item relative to the conversion path.

In some implementations, the content attribution module 140 can provide, for display, a metric to one or more content providers of the content items based on the credit attributed to the identified one or more content items for a conversion based on the new device identifier or the new carrier identifier. In some implementations, the content attribution module 140 can determine, for each content item, metrics based on credit attributed to the content item. In some implementations, the content attribution module 140 can provide information about where in the conversion funnel, the content item is likely to increase conversions. In some implementations, the content attribution module 140 can provide information about which content items to display early in the conversion funnel and which content items to display later in the conversion funnel. In some implementations, the content attribution module 140 can determine the click through rate or conversion rate of content items of a first communication device when provided for display on a second communication device. In some implementations, the content attribution module 140 can use information from the conversions and the database to determine which communication device an account identifier is likely to switch to based on the current communication device or carrier with which the account identifier is currently associated.

Although the conversion detection module 135 can be configured to detect that a user associated with an account identifier changed devices by simply comparing device identifiers included in entries of the table of entries corresponding to the account identifier, doing so may not provide the complete history of actual device conversions. For instance, if the user logs into the account of the account identifier from a guest computer, such as a computer at a public place or a friend's computer, the conversion detection module 135 may detect a conversion if further analysis is not performed. In another instance, the user's account can get hacked and a second user may receive content on a communication device of the second user. To avoid identifying such instances of short-term device changes as conversion events, the conversion detection module 135 can identify a conversion event as a valid conversion when the conversion detection module 135 statistically determines that there is a change in device. To do so, the conversion detection module 135 can analyze the entries included in the table to determine that the number of searches corresponding to the search queries made from the new communication device is greater than a threshold amount. The threshold amount can vary user by user as some users search very frequently while other users may not search as much. It may also vary based on weekday searches or weekend searches. As such, the conversion detection module 135 can normalize searching patterns over a week or other length of time to better determine that a conversion event corresponds to an actual conversion.

In some implementations, the content attribution module 140 can be configured to attribute a conversion of a device or carrier to one or more content items provided to the user of the account identifier. In some implementations, the content attribution module 140 can identify, from the table of entries, one or more tasks or actions performed by the user and a time at which the actions were performed relative to the time that the conversion was detected. This is based on the assumption that users will perform certain tasks before they switch devices or carriers. For instance, users will search for the device they are seeking to buy, they will search for the carrier to which they are switching, among others. By determining which ads the users viewed and clicked, and when they viewed or clicked the ads relative to the time the conversion was detected, the content attribution module 140 can better determine whether the ads likely attributed towards the conversion.

Figure 4:
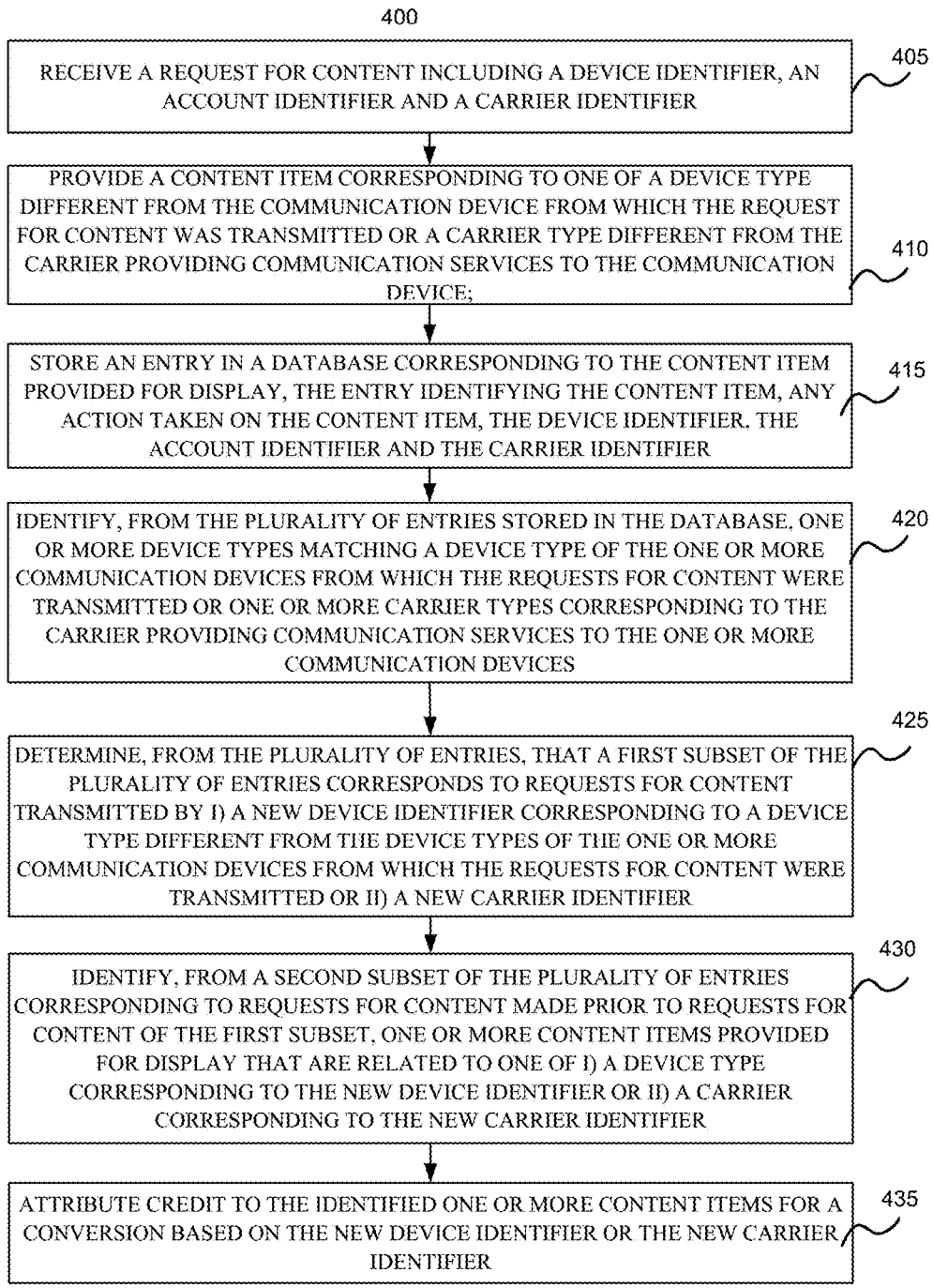
FIG. 4 is a flow diagram depicting a method of detecting device or carrier change conversions based on device information and carrier information that is received with requests to provide content to communication devices, according to an illustrative implementation.

FIG. 4 is a flow diagram depicting a method for detecting device or carrier change conversions based on device information and carrier information that is received with requests to provide content to communication devices in a computer network environment. The functionality described in the method can be performed by a data processing system, such as the data processing system 110 shown in FIG. 1. The data processing system can receive a request to provide content to a communication device, the request to provide content including a device identifier identifying the communication device to which to provide the content, an account identifier identifying an account agnostic to the communication device, and a carrier identifier identifying a carrier providing communication services to the communication device (BLOCK 405). The data processing system can provide, responsive to the request to provide content, a content item corresponding to one of a device type different from the communication device to which to provide the content or a carrier type different from the carrier providing communication services to the communication device (BLOCK 410). The data processing system can store, in a database, an entry corresponding to the content item provided for display in response to the request to provide content, the entry identifying the content item provided for display, any action taken on the content item, the device identifier, the account identifier and the carrier identifier associated with the request to provide content to which the entry corresponds, the database storing a plurality of entries corresponding to content items previously displayed in response to requests to provide content including the account identifier (BLOCK 415). The data processing system can identify, from the plurality of entries corresponding to the account identifier that are stored in the database, one or more device types matching a device type of the one or more communication devices to which to provide the content or one or more carrier types corresponding to the carrier providing communication services to the one or more communication devices (BLOCK 420). The data processing system can determine, from the plurality of entries, that a first subset of the plurality of entries corresponds to requests to provide content to a new device identifier corresponding to a device type different from the device types of the one or more communication devices to which to provide the content or a new carrier identifier (BLOCK 425). The data processing system can identify, from a second subset of the plurality of entries corresponding to requests to provide content made prior to requests to provide content of the first subset, one or more content items provided for display that are related to one of a device type corresponding to the new device identifier or a carrier corresponding to the new carrier identifier (BLOCK 430). The data processing system can attribute credit to the identified one or more content items for a conversion based on the new device identifier or the new carrier identifier (BLOCK 435).

In further detail, the data processing system can receive a request to provide content to a communication device (BLOCK 405). The request to provide content can include one or more of a device identifier identifying the communication device to which to provide the content, an account identifier identifying an account agnostic to the communication device, and a carrier identifier identifying a carrier providing communication services to the communication device. In some implementations, the device identifier can be the International Mobile Station Equipment Identity (IMEI) of the device. In some implementations, through the device identifier, the data processing system can determine the type of device, for example, a laptop, mobile phone, tablet, phablet, among others. In some implementations, the type of device may be more granular and can identify one or more of the model, make and manufacturer of the communication device. In some implementations, the device identifier can be any identifier that can be used to identify the model, make and manufacturer of the communication device. In some implementations, the device identifier can be a hash or other function of any identifier that uniquely identifies the communication device. In some implementations, the device identifier can be based on one or more of a Subscriber Identity Module (SIM), network interface identifier, or any other identifier that is unique to the device.

The account identifier included in the request can be a cookie or other identifier associated with a particular account of an application, browser, or other entity executing on the device. In some implementations, the account identifier can be associated with a social networking platform. In some implementations, the account identifier can be used to identify a particular user of a device such that if multiple users utilize the same communication device, the data processing system can distinguish between the multiple users through the account identifier. In some implementations, the account identifier may include sign-in information of a particular user.

The carrier identifier included in the request can be an identifier that provides communication services to the communication device. The carrier identifier can be provided by the carrier. In some implementations, the carrier identifier can be unique to the communication device. In some implementations, the carrier identifier can be generic to multiple communication devices that utilize the same carrier. In some implementations, the carrier identifier can be based on a network interface of the communication device through which the communication device receives communication services of the provider. In some implementations, a communication device can have one or more carrier identifiers. The carrier identifier included in the request is based on the carrier providing communication services through which the request is transmitted by the communication device. In some implementations in which the request does not include the carrier identifier, the data processing system can determine the carrier through which the communication device transmitted the request. In some implementations, the data processing system can determine the carrier based on a location of the communication device, routing information included in the request, among others.

The request to provide content can include a search query. In some implementations, the request to provide content received by the data processing system can be generated in response to receiving a request to provide primary content from a communication device. In some implementations, the request to provide content received by the data processing system can be generated in response to receiving a request to provide search query results from a communication device. In some implementations, the request to provide content received by the data processing system includes the search query for which the search query results are requested. In some implementations, the request to provide content can be based on a search query related to communication devices or carriers. In some implementations, the search query can be a search query for communication device-related queries, such as the APPLE IPHONE, NEXUS, MACBOOK, ANDROID, SAMSUNG GALAXY S5, IPAD, among others, or carrier specific queries, such as cell phone plans, mobile phone plans, AT&T, TMOBILE, family plans, among others.

The data processing system can provide, responsive to the request to provide content, a content item corresponding to one of a device type different from the communication device to which to provide the content or a carrier type different from the carrier providing communication services to the communication device (BLOCK 410). In some implementations, the data processing system can select a content item to provide, for presentation at the communication device associated with the request to provide content. In some implementations, the data processing system can select a content item based on the contents of the request to provide content, including but not limited to the search query, the device identifier, the carrier identifier, among others. In some implementations, the data processing system can select the content item based on an auction for serving content to the communication device. The auction can be based on a keyword that matches or is related to the search query included in the request to provide content. In some implementations, the data processing system can identify the search query, match the search query to one or more keywords on which advertisers are willing to bid, and then run an auction on the matched keywords. In some implementations, an advertiser supplying content related to a second communication device different from the communication device identified by the device identifier included in the request may seek to bid higher to display the content related to the second communication device based on the search query included in the request and the type of communication device identified by the device identifier. In some implementations, an advertiser supplying content related to a second carrier different from the carrier identified by the carrier identifier included in the request may seek to bid higher to display the content related to the second carrier based on the search query included in the request and the carrier identified by the carrier identifier.

The data processing system can store an entry corresponding to the content item provided for display in a database (BLOCK 415). In some implementations, the data processing system can store, in the database, the entry corresponding to the content item provided for display in response to identifying the content to provide to the communication device based on the request to provide content. The entry can identify the content item provided for display, any action taken on the content item, the device identifier, the account identifier and the carrier identifier included in the request to provide content to which the entry corresponds. In some implementations, the database can store a plurality of entries corresponding to content items previously displayed in response to requests to provide content including the account identifier. Each entry can include a plurality of fields. In some implementations, each entry can include one or more values based on the plurality of fields. Examples of the fields can include a timestamp at which the content item was provided for display or the request to provide content was received, a content identifier identifying the content item provided for the display, a device identifier corresponding to the communication device to which the content item was provided, a carrier identifier corresponding to the carrier providing service to the communication device, an account identifier corresponding to an account associated with a browser, application or other entity of the communication device, keyword or query data, location data associated with the communication device, a device type and an action type corresponding to the type of action taken on the content item. The data processing system can update the database to include a new entry each time a content item is served. In some implementations, the data processing system can update the entry to include the action type responsive to an action taken at the communication device.

The data processing system can identify, from the plurality of entries stored in the database, one or more device types matching a device type of the one or more communication devices to which to provide the content or one or more carrier types corresponding to the carrier providing communication services to the one or more communication devices (BLOCK 420). In some implementations, the database can include a plurality of entries corresponding to requests to provide content to communication devices associated with a particular account identifier. In some implementations, the database can include entries corresponding to multiple account identifiers. In some implementations, the data processing system can identify a portion of the entries that correspond to a particular account identifier.

In some implementations, the data processing system can execute an algorithm to identify any account identifier that is included in entries in which a new device identifier or carrier identifier has been included. A new device identifier or carrier identifier can be a device identifier or carrier identifier that has previously not been associated or included in entries included in the account identifier. Stated in another way, if entries corresponding to the account identifier have historically been associated with a particular carrier identifier and a particular communication device, and then the database includes entries corresponding to the same account identifier now include a new device identifier or a new carrier identifier, the data processing system can determine that the account identifier is receiving content via a new device or new carrier.

In some implementations, the data processing system can identify, from the plurality of entries corresponding to a particular account identifier, one or more communication devices linked to the account identifier. Similarly, the data processing system can identify, from the plurality of entries corresponding to a particular account identifier, one or more communication devices linked to the account identifier. From these entries, the data processing system can generate a list of communication devices and carriers the account identifier uses to receive content. In some implementations, the list of communication devices and carriers can include device identifiers and carrier identifiers. In some implementations, the list of communication devices and carriers can include the types of communication devices, for example, the make, manufacturer and model of the communication devices, and the carrier types, for example, the identity of the carrier providing communication services to the communication devices through which the account identifier receives content.

In some implementations, the data processing system can identify entries within a predetermined time period. In some implementations, the data processing system can identify entries in which content was provided within the past week, month, few months, or year. In some implementations, the data processing system can periodically update the list of communication devices and carriers generated for each account identifier. In some implementations, the data processing system can update the list of communication devices and carriers generated for each account identifier every day, week, month, among others.

The data processing system can determine, from the plurality of entries, that a first subset of the plurality of entries corresponding to the account identifier corresponds to requests to provide content to a new device identifier corresponding to a device type different from the device types of the one or more communication devices to which to provide the content or a new carrier identifier different from the carrier types of the one or more carriers providing communication services to the one or more communication devices (BLOCK 425). In some implementations, the data processing system can identify, from the plurality of entries corresponding to the account identifier, one or more entries that include the same account identifier but include a device identifier not included in the list of device identifiers. Such entries indicate that a user associated with the account identifier used a device different from other communication devices the account identifier has previously used in the past to receive content. To identify the entries that include the same account identifier but include a device identifier not included in the list of device identifiers, the data processing system can use filters on the database to identify only those entries that include the account identifier but use a device identifier different from any of the device identifiers included in the list of device identifiers generated by the data processing system.

In some implementations, the data processing system can identify, from the plurality of entries corresponding to the account identifier, one or more entries that include the same account identifier but include a carrier identifier not included in the list of device identifiers. Such entries indicate that a user associated with the account identifier used a carrier different from other carriers the account identifier has previously used in the past to receive content. To identify the entries that include the same account identifier but include a carrier identifier not included in the list of carrier identifiers, the data processing system can use filters on the database to identify only those entries that include the account identifier but use a carrier identifier different from any of the carrier identifiers included in the list of carrier identifiers generated by the data processing system.

In some implementations, the data processing system can identify one or more device types corresponding to the one or more communication devices to which to provide the content by identifying a first set of entries corresponding to the account identifier. The first set of entries can be generated responsive to requests to provide content made within a first predetermined time period that ends prior to determining that the subset of the plurality of entries corresponds to requests to provide content including the new device identifier. The data processing system can then identify, from the first set of entries, one or more device identifiers to which to provide the content as valid device identifiers and generate a list of qualified device identifiers corresponding to the account identifier including the one or more valid device identifiers. A valid device identifier can include device identifiers that the account identifier has been associated with in previous entries. In some implementations, a device identifier can be determined to be valid if more than a predetermined number of entries including the same account identifier also include the device identifier. In some implementations, a user may occasionally use a communication device that is not a communication device that they normally use. For instance, the user may use a communication device at a public library, or at an electronics store, or at a friend's house. To prevent the data processing system from determining that the user switched to a new communication device when the user uses a communication device on a temporary basis, the data processing system can implement some checks and balances or thresholds. For instance, the data processing system can require the device identifier of the new communication device to be included in more than predetermined number of requests to provide content. In some implementations, the data processing system can require the device identifier to be included in requests from more than a predetermined number of geographic locations. In some implementations, the data processing system can require the device identifier to be included in requests over a plurality of time periods, for example, over 3 different 24 hour periods.

In some implementations, the data processing system can identify, from the plurality of entries, a number of requests to provide content corresponding to a valid device identifier of the qualified device identifiers. The data processing system can determine that the number of requests to provide content corresponding to the device identifier is less than a predetermined threshold. The data processing system can then identify the device identifier as an invalid device identifier not suitable for inclusion in the list of qualified device identifiers responsive to determining that the number of requests to provide content corresponding to the device identifier is less than the predetermined threshold.

In some implementations, the data processing system can identify one or more device types corresponding to the one or more communication devices to which to provide the content by identifying a first set of entries corresponding to the account identifier. The first set of entries can be generated responsive to requests to provide content made within a first predetermined time period that ends prior to determining that the subset of the plurality of entries corresponds to requests to provide content including the new carrier identifier. The data processing system can identify, from the first set of entries, one or more carrier identifiers to which to provide the content as valid carrier identifiers and generate a list of qualified carrier identifiers corresponding to the account identifier. The list of qualified carrier identifiers can include the one or more qualified carrier identifiers.

In some implementations, the data processing system can identify, from the plurality of entries, a number of requests to provide content corresponding to a valid carrier identifier of the valid carrier identifiers. The data processing system can determine that the number of requests to provide content corresponding to the carrier identifier is less than a predetermined threshold. The data processing system can then exclude the carrier identifier from inclusion in the list of qualified carrier identifiers responsive to determining that the number of requests to provide content is less than the predetermined threshold.

The data processing system can identify, from a second subset of the plurality of entries corresponding to requests to provide content made prior to requests to provide content of the first subset, one or more content items provided for display that are related to one of a device type corresponding to the new device identifier or a carrier corresponding to the new carrier identifier (BLOCK 430). In some implementations, the data processing system can identify a second subset of the plurality of entries that correspond to requests to provide content that were received prior to the requests to provide content corresponding to the first subset of the plurality of entries. The first subset of the plurality of entries correspond to entries in which the either the device identifier included in the request or the carrier identifier included in the request is different from the device identifiers or carrier identifiers included in previous requests to provide content. The second subset of the plurality of entries can correspond to entries that do not include one or more of the device identifier or carrier identifier included in the entries of the first subset.

Responsive to identifying the second subset of the plurality of entries, the data processing system can identify the content items provided in response to the requests to provide content. In some implementations, the data processing system can identify, from the plurality of identified content items, one or more content items that are related to one of a device type corresponding to the new device identifier or a carrier corresponding to the new carrier identifier. In some implementations, the data processing system can identify one or more content items provided for display that are related to one of a device type corresponding to the new device identifier or a carrier corresponding to the new carrier identifier by identifying that the content item was selected for display based on a keyword identifying the device type corresponding to the new device identifier or the carrier corresponding to the new carrier identifier.

The data processing system can determine that a particular content item is related to a device type corresponding to the new device identifier by analyzing the content item itself, the landing page of the content item, the advertiser providing the content item, among others. Similarly, the data processing system can determine that a particular content item is related to a carrier type corresponding to the new carrier identifier by analyzing the content item itself, the landing page of the content item, the advertiser providing the content item, among others. In some implementations, the data processing system can determine that the content item is related to the device type of the new device identifier by first identifying the device type of the new device identifier and matching text in the content item or the landing page of the content item to the device type.

In some implementations, the data processing system can identify one or more content items provided for display that are related to one of a device type corresponding to the new device identifier or a carrier corresponding to the new carrier identifier by identifying, from the content item, the device type corresponding to the new device identifier or the carrier corresponding to the new carrier identifier.

In some implementations, the data processing system can identify only those content items on which an action was taken. For example, the data processing system can identify content items on which the user associated with the account identifier clicked or took some other action. In some implementations, the data processing system can identify content items that were provided for display that received a valid impression. In this way, even if the user did not take an action on the content item but was shown the content item, credits due to a conversion may be attributed to the content item.

The data processing system can attribute credit to the identified one or more content items for a conversion based on the new device identifier or the new carrier identifier (BLOCK 435). In some implementations, the data processing system can attribute credit responsive to identifying a conversion path identifying the one or more content items that contributed to the conversion. A content item may be determined to contribute towards the conversion if the content item receives a valid impression. In some implementations, the content item may be determined to contribute towards the conversion if the content item receives an action, such as a click. In some implementations, the amount of credit attributed to the content item may be based on a type of action taken on the content item. For instance, the amount of credit attributed to a content item that received a valid impression but not a click can be less than a content item that received a click. In some implementations, the amount of credit attributed to a content item can be based on the conversion funnel and the position of the content item relative to the conversion path.

In some implementations, the data processing system can provide, for display, a metric to one or more content providers of the content items based on the credit attributed to the identified one or more content items for a conversion based on the new device identifier or the new carrier identifier. In some implementations, the data processing system can determine, for each content item, metrics based on credit attributed to the content item. In some implementations, the data processing system can provide information about where in the conversion funnel, the content item is likely to increase conversions. In some implementations, the data processing system can provide information about which content items to display early in the conversion funnel and which content items to display later in the conversion funnel. In some implementations, the data processing system can determine the click through rate or conversion rate of content items of a first communication device when provided for display on a second communication device. In some implementations, the data processing system can use information from the conversions and the database to determine which communication device an account identifier is likely to switch to based on the current communication device or carrier with which the account identifier is currently associated.

Figure 5:
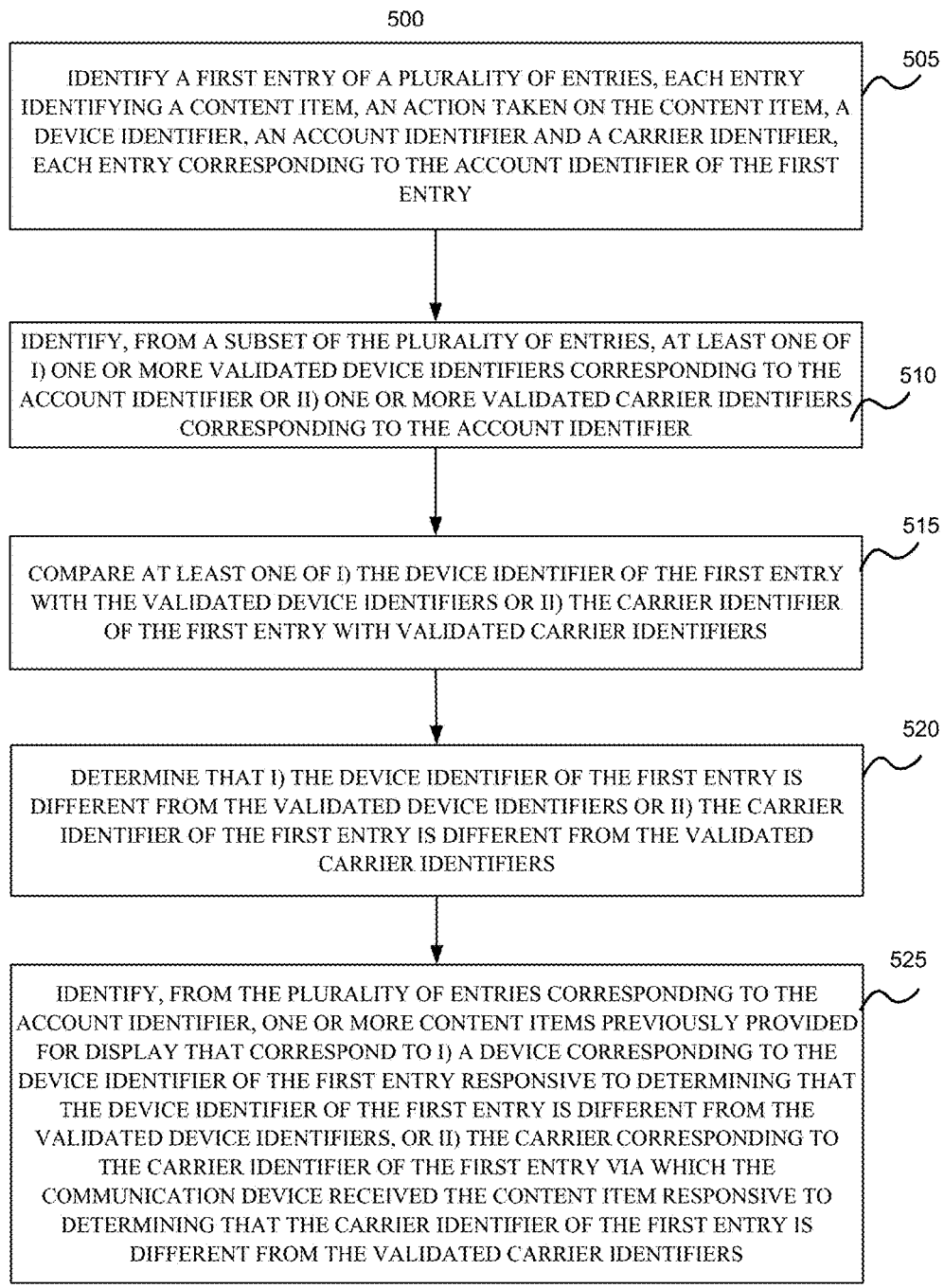
FIG. 5 is a flow diagram depicting a method of detecting device or carrier change conversions based on device information and carrier information that is received with requests to provide content to communication devices, according to an illustrative implementation.

FIG. 5 is another flow diagram depicting a method for detecting device or carrier change conversions based on device information and carrier information that is received with requests to provide content to communication devices in a computer network environment. The functionality described in the method can be performed by a data processing system, such as the data processing system 110 shown in FIG. 1. The data processing system can identify a first entry of a plurality of entries (BLOCK 505). Each entry of the plurality of entries identifies a content item provided for display, an action taken on the content item, a device identifier identifying a communication device on which the content item was provided for display, an account identifier identifying an account independent of the communication device and a carrier identifier identifying a carrier via which the communication device received the content item, each entry of the plurality of entries corresponding to the account identifier of the first entry. The data processing system can identify, from a subset of the plurality of entries, at least one of i) one or more validated device identifiers corresponding to the account identifier or ii) one or more validated carrier identifiers corresponding to the account identifier (BLOCK 510). The data processing system can compare at least one of i) the device identifier of the first entry with the validated device identifiers or ii) the carrier identifier of the first entry with validated carrier identifiers (BLOCK 515). The data processing system can determine that i) the device identifier of the first entry is different from the validated device identifiers or ii) the carrier identifier of the first entry is different from the validated carrier identifiers (BLOCK 520). The data processing system then identifies, from the plurality of entries corresponding to the account identifier, one or more content items previously provided for display that correspond to i) a device corresponding to the device identifier of the first entry responsive to determining that the device identifier of the first entry is different from the validated device identifiers, or ii) the carrier corresponding to the carrier identifier of the first entry via which the communication device received the content item responsive to determining that the carrier identifier of the first entry is different from the validated carrier identifiers (BLOCK 525).

The data processing system can identify a first entry of a plurality of entries (BLOCK 505). Each entry of the plurality of entries can correspond to the account identifier of the first entry. In other words, each of the entries of the plurality of entries is generated in response to providing a content t item to a communication device linked to the account identifier. In some implementations, the data processing system can store the entries in a database. The database can include tables specific to particular account identifiers, such that each table can include entries corresponding to content items served on communication devices associated with a particular account identifier. The entries can be generated each time a request to serve a content item is received or a content item is provided for display. The data processing system can create an entry identifying one or more of i) a content item provided for display, ii) an action taken on the content item, iii) a device identifier identifying a communication device on which the content item was provided for display, iv) an account identifier identifying an account independent of the communication device and v) a carrier identifier identifying a carrier via which the communication device received the content item, among others. In some implementations, the entry can include geographic information identifying a location of the communication device and a time at which the content item is provided to the communication device. Examples of types of actions that can be taken on the content item can include clicks, conversions, hover overs, viewed, not viewed, among others. In addition, the entry can include other information, such as the identity of the information resource on which the content item was served, the keyword on which the content provider bid on to serve the content item, the size of the content item, among others.

The data processing system can identify, from a subset of the plurality of entries, at least one of i) one or more validated device identifiers corresponding to the account identifier or ii) one or more validated carrier identifiers corresponding to the account identifier (BLOCK 510). In some implementations, the data processing system can identify one or more valid device identifiers based on entries including the account identifier. In some implementations, the data processing system can determine one or more valid device identifiers or carrier identifiers corresponding to the account identifier. In some implementations, determining one or more valid device identifiers corresponding to the account identifier includes identifying, by the data processing system, a second entry of the plurality of entries, identifying a device identifier included in the second entry as a candidate valid device identifier, and indicating that the identified candidate device identifier is valid.

In some implementations, the data processing system can identify a device identifier included in the second entry as a candidate valid device identifier by identifying, from a subset of the plurality of entries corresponding to the account identifier, a number of entries including the device identifier included in the second entry. The data processing system can then identify one or more parameters of the entries including the device identifier. The data processing system can determine that the parameters of the entries satisfy a threshold. The data processing system can, responsive to determining that the parameters of the entries satisfy a threshold, identify that the device identifier included in the second entry is a valid device identifier. Examples of parameters include a number of entries, the location of the communication device when receiving the content item, the time difference between requests made from the same communication device, the time of day and day of week that the content item was provided to the communication device, among others. In some implementations, the data processing system may determine if the device identifier is included in entries corresponding to a large number of account identifiers, which may be indicative of a communication device that is accessible to many people, such as a communication device at a public library, store, among others.

In some implementations, determining one or more valid device identifiers corresponding to the account identifier includes identifying, for each entry of at least a subset of the plurality of entries, a device identifier included in the entry, determining, from the subset of the plurality of entries, a first number of entries that included the device identifier and responsive to determining that the first number of entries exceeds a threshold number of entries, identifying the device identifier as a valid device identifier.

In some implementations, determining one or more valid carrier identifiers corresponding to the account identifier includes identifying, by the data processing system, a second entry of the plurality of entries, identifying a carrier identifier included in the second entry as a candidate valid carrier identifier, and indicating that the identified candidate carrier identifier is valid.

In some implementations, the data processing system can identify a carrier identifier included in the second entry as a candidate valid carrier identifier by identifying, from a subset of the plurality of entries corresponding to the account identifier, a number of entries including the carrier identifier included in the second entry. The data processing system can identify one or more parameters of the entries including the carrier identifier and determine that the parameters of the entries satisfy a threshold. Responsive to determining that the parameters of the entries satisfy a threshold, the data processing system can identify that the carrier identifier included in the second entry is a valid device identifier.

The data processing system can compare at least one of i) the device identifier of the first entry with the validated device identifiers or ii) the carrier identifier of the first entry with validated carrier identifiers (BLOCK 515). The data processing system can compare the device identifier of the first entry with the valid device identifiers by matching the device identifiers. In some implementations, the data processing system may identify a plurality of entries generated within a particular time period and compare the device identifier of each of the generated plurality of entries with one or more device identifiers identified as valid device identifiers. A similar comparison can be made for carrier identifiers.

The data processing system can determine that i) the device identifier of the first entry is different from the validated device identifiers or ii) the carrier identifier of the first entry is different from the validated carrier identifiers (BLOCK 520). Responsive to determining that the device identifier of the first entry is different from the validated device identifiers, the data processing system can determine if the device identifier of the first entry represents a switch in devices by the user of the account identifier. In some implementations, the data processing system can determine if the device identifier corresponds to a new device to which the user of the account identifier has switched. To do so, the data processing system may identify one or more entries associated with the account identifier that also identifies the device identifier corresponding to the new device and analyze these entries to determine if the user has switched devices. The data processing system may include a plurality of rules for identifying if a new device identifier corresponds to a device to which the user of the account identifier has switched. For instance, the rules can be based on a number of entries, a time between two of the entries, the locations of the communication device associated with the entries, among others. For instance, if the device identifier is associated with entries corresponding to the same account identifier that correspond to two separate days, and two separate locations, the data processing system can determine that the device identifier corresponds to a communication device to which the user of the account identifier has switched. The data processing system can also detect a carrier change in a similar manner.

The data processing system then identifies, from the plurality of entries corresponding to the account identifier, one or more content items previously provided for display that correspond to i) a device corresponding to the device identifier of the first entry responsive to determining that the device identifier of the first entry is different from the validated device identifiers, or ii) the carrier corresponding to the carrier identifier of the first entry via which the communication device received the content item responsive to determining that the carrier identifier of the first entry is different from the validated carrier identifiers (BLOCK 525). In some implementations, the data processing system can attribute credit to the identified one or more content items for a conversion based on the new device identifier or the new carrier identifier. In some implementations, the data processing system can provide, for display, a metric to one or more content providers of the content items based on the credit attributed to the identified one or more content items for a conversion based on the new device identifier or the new carrier identifier.

In some implementations, the data processing system can receive a request to provide content, the request to provide content including the device identifier identifying the communication device to which to provide the content, the account identifier, and the carrier identifier identifying the carrier providing communication services to the communication device, provide, responsive to the request to provide content, a content item corresponding to one of a device type different from the communication device to which to provide the content or a carrier type different from the carrier providing communication services to the communication device and store, in a database, an entry corresponding to the content item provided for display in response to the request to provide content, the entry identifying the content item provided for display, at least one action taken on the content item, the device identifier, the account identifier and the carrier identifier associated with the request to provide content to which the entry corresponds, the database storing the plurality of entries corresponding to the account identifier.

Figure 6:
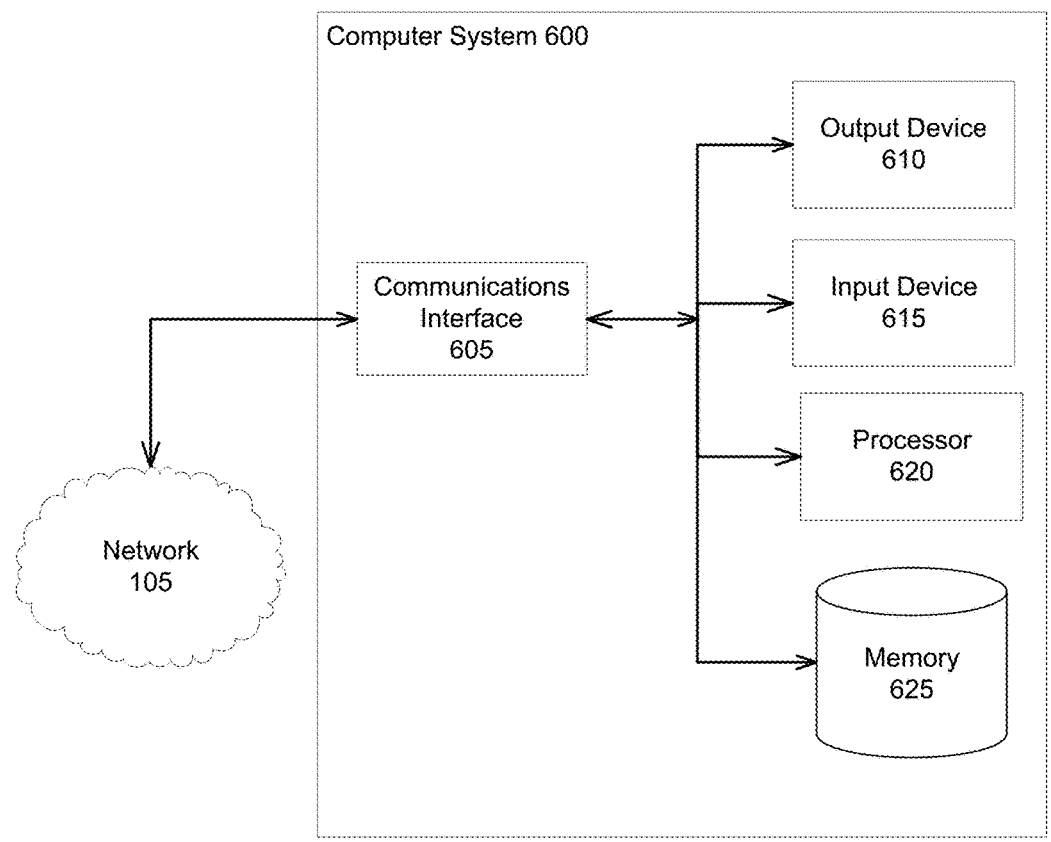
FIG. 6 is a block diagram illustrating a general architecture for a computer system that may be employed to implement elements of the systems and methods described and illustrated herein, according to an illustrative implementation.

FIG. 6 shows the general architecture of an illustrative computer system 600 that may be employed to implement any of the computer systems discussed herein (including the system 110 and its components such as the content selection module 130, the conversion detection module 135 and the content attribution module 140) in accordance with some implementations. The computer system 600 can be used to provide information via the network 105 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 110 or the other components of the system 110 such as the content selection module 130, the conversion detection module 135 and the content attribution module 140.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 625 to store information related to the availability of inventory of one or more content units, reservations of one or more content units, among others. The memory 625 can include the database 145. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1, one or more communications interfaces facilitate information flow between the components of the system 60. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the data processing system 60.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content selection module 130, the conversion detection module 135 and the content attribution module 140 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 600 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the content selection module 130, the conversion detection module 135 and the content attribution module 140 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to detecting device or carrier change conversions based on device information and carrier information that is received with requests to provide content to communication devices, the systems and methods described herein can be applied to other environments in which data included in a request for content is used and compared to data corresponding to previous requests for content and responsive to determining a change in the data, identifying one or more content items to which to attribute the credit for the change. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for detecting device or carrier change conversions based on device information and carrier information that is received with requests to provide content to communication devices, comprising:
   identifying, by a data processing system including one or more processors, a first entry of a plurality of entries in a database of content presentation events, each entry of the plurality of entries respectively identifying a content item provided for display, an action taken on the content item, a device identifier identifying a communication device on which the content item was provided for display, an account identifier identifying an account independent of the communication device, and a carrier identifier identifying a carrier, wherein the carrier is a service provider that provides communication services to the communication device, each entry of the plurality of entries corresponding to the account identifier of the first entry;
   identifying, by the data processing system, from a subset of the plurality of entries corresponding to the account identifier, at least one of i) one or more validated device identifiers corresponding to the account identifier present in the subset of the plurality of entries at least a first threshold number of times or ii) one or more validated carrier identifiers corresponding to the account identifier present in the subset of the plurality of entries at least a second threshold number of times;
   comparing, by the data processing system, at least one of i) the device identifier of the first entry with the validated device identifiers to determine the device identifier of the first entry is different from the validated device identifiers, or ii) the carrier identifier of the first entry with validated carrier identifiers to determine that the carrier identifier of the first entry is different from the validated carrier identifiers; and
   identifying, from the plurality of entries corresponding to the account identifier, one or more content items previously provided for display that correspond to i) a device corresponding to the device identifier of the first entry responsive to determining that the device identifier of the first entry is different from the validated device identifiers, or ii) the carrier corresponding to the carrier identifier of the first entry via which the communication device received the content item responsive to determining that the carrier identifier of the first entry is different from the validated carrier identifiers.

2. The method of claim 1, the method further comprising:
   identifying, by the data processing system, a second entry of the plurality of entries;
   identifying a device identifier included in the second entry as a candidate valid device identifier; and
   indicating that the identified candidate device identifier is valid.

3. The method of claim 2, the method further comprising:
   identifying, from a subset of the plurality of entries corresponding to the account identifier, a number of entries including the device identifier included in the second entry;
   identifying, by the data processing system, one or more parameters of the entries including the device identifier;
   determining, by the data processing system, that the parameters of the entries satisfy a threshold; and
   responsive to determining that the parameters of the entries satisfy a threshold, identifying, by the data processing system, that the device identifier included in the second entry is a valid device identifier.

4. The method of claim 1, the method further comprising:
   identifying, for each entry of at least a subset of the plurality of entries, a device identifier included in the entry;
   determining, from the subset of the plurality of entries, a first number of entries that included the device identifier; and
   responsive to determining that the first number of entries exceeds a threshold number of entries, identifying the device identifier as a valid device identifier.

5. The method of claim 4, the method further comprising:
   identifying, by the data processing system, a second entry of the plurality of entries;
   identifying a carrier identifier included in the second entry as a candidate valid carrier identifier; and
   indicating that the identified candidate carrier identifier is valid.

6. The method of claim 5, the method further comprising:
   identifying, from a subset of the plurality of entries corresponding to the account identifier, a number of entries including the carrier identifier included in the second entry;
   identifying, by the data processing system, one or more parameters of the entries including the carrier identifier;
   determining, by the data processing system, that the parameters of the entries satisfy a threshold; and
   responsive to determining that the parameters of the entries satisfy a threshold, identifying, by the data processing system, that the carrier identifier included in the second entry is a valid device identifier.

7. The method of claim 1, further comprising attributing credit to the identified one or more content items for a conversion based on the new device identifier or the new carrier identifier.

8. The method of claim 7, further comprising providing, for display, by the data processing system, a metric to one or more content providers of the content items based on the credit attributed to the identified one or more content items for a conversion based on the new device identifier or the new carrier identifier.

9. The method of claim 1, further comprising:
   receiving, by the data processing system, a request to provide content, the request to provide content including the device identifier identifying the communication device to which to provide the content, the account identifier, and the carrier identifier identifying the carrier providing communication services to the communication device;

providing, by the data processing system, responsive to the request to provide content, a content item corresponding to one of a device type different from the communication device to which to provide the content or a carrier type different from the carrier providing communication services to the communication device; and storing, by the data processing system, in a database, an entry corresponding to the content item provided for display in response to the request to provide content, the entry identifying the content item provided for display, at least one action taken on the content item, the device identifier, the account identifier and the carrier identifier associated with the request to provide content to which the entry corresponds, the database storing the plurality of entries corresponding to the account identifier.

10. A system for detecting device or carrier change conversions based on device information and carrier information that is received with requests to provide content to communication devices in a computer network environment, the system comprising:

a database of content presentation events; and
a physical processor configured to:
identify a first entry of a plurality of entries in the database of content presentation events, each entry of the plurality of entries respectively identifying a content item provided for display, an action taken on the content item, a device identifier identifying a communication device on which the content item was provided for display, an account identifier identifying an account independent of the communication device, and a carrier identifier identifying a carrier wherein the carrier is a service provider that provides communication services to the communication device, each entry of the plurality of entries corresponding to the account identifier of the first entry;
identify, from a subset of the plurality of entries corresponding to the account identifier, at least one of i) one or more validated device identifiers corresponding to the account identifier present in the subset of the plurality of entries at least a first threshold number of times or ii) one or more validated carrier identifiers corresponding to the account identifier present in the subset of the plurality of entries at least a second threshold number of times;
compare at least one of i) the device identifier of the first entry with the validated device identifiers to determine that the device identifier of the first entry is different from the validated device identifiers, or ii) the carrier identifier of the first entry with validated carrier identifiers to determine that the carrier identifier of the first entry is different from the validated carrier identifiers; and
identify, from the plurality of entries corresponding to the account identifier, one or more content items previously provided for display that correspond to i) a device corresponding to the device identifier of the first entry responsive to determining that the device identifier of the first entry is different from the validated device identifiers, or ii) the carrier corresponding to the carrier identifier of the first entry via which the communication device received the content item responsive to determining that the carrier identifier of the first entry is different from the validated carrier identifiers.

11. The system of claim 10, wherein the physical processor is further configured to:
identify a second entry of the plurality of entries;
identify a device identifier included in the second entry as a candidate valid device identifier; and
indicate that the identified candidate device identifier is valid.

12. The system of claim 11, wherein the physical processor is further configured to:
identify, from a subset of the plurality of entries corresponding to the account identifier, a number of entries including the device identifier included in the second entry; and
identify one or more parameters of the entries including the device identifier;
determine that the parameters of the entries satisfy a threshold; and
responsive to determining that the parameters of the entries satisfy a threshold, identify that the device identifier included in the second entry is a valid device identifier.

13. The system of claim 10, wherein the physical processor is further configured to:
identify, for each entry of at least a subset of the plurality of entries, a device identifier included in the entry;
determine, from the subset of the plurality of entries, a first number of entries that included the device identifier; and
responsive to determining that the first number of entries exceeds a threshold number of entries, identify the device identifier as a valid device identifier.

14. The system of claim 13, wherein the physical processor is further configured to:
identify a second entry of the plurality of entries;
identify a carrier identifier included in the second entry as a candidate valid carrier identifier; and
indicate that the identified candidate carrier identifier is valid.

15. The system of claim 14, wherein the physical processor is further configured to:
identify, from a subset of the plurality of entries corresponding to the account identifier, a number of entries including the carrier identifier included in the second entry; and
identify one or more parameters of the entries including the carrier identifier;
determine that the parameters of the entries satisfy a threshold; and
responsive to determining that the parameters of the entries satisfy a threshold, identify that the carrier identifier included in the second entry is a valid device identifier.

16. The system of claim 10, wherein the physical processor is further configured to attribute credit to the identified one or more content items for a conversion based on the new device identifier or the new carrier identifier.

17. The system of claim 16, wherein the physical processor is further configured to provide, for display, a metric to one or more content providers of the content items based on the credit attributed to the identified one or more content items for a conversion based on the new device identifier or the new carrier identifier.

18. The system of claim 10, wherein the physical processor is further configured to:

receive a request to provide content, the request to provide content including the device identifier identifying the communication device to which to provide the content, the account identifier, and the carrier identifier identifying the carrier providing communication services to the communication device;

provide, responsive to the request to provide content, a content item corresponding to one of a device type different from the communication device to which to provide the content or a carrier type different from the carrier providing communication services to the communication device; and store, in a database, an entry corresponding to the content item provided for display in response to the request to provide content, the entry identifying the content item provided for display, at least one action taken on the content item, the device identifier, the account identifier and the carrier identifier associated with the request to provide content to which the entry corresponds, the database storing the plurality of entries corresponding to the account identifier.

\* \* \* \* \*